(12) United States Patent
Kimura et al.

(10) Patent No.: US 7,894,988 B2
(45) Date of Patent: Feb. 22, 2011

(54) VEHICLE DRIVING ASSIST SYSTEM

(75) Inventors: Takeshi Kimura, Yokohama (JP);
Yosuke Kobayashi, Yokohama (JP);
Nobuyuki Kuge, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 917 days.

(21) Appl. No.: 11/764,843

(22) Filed: Jun. 19, 2007

(65) Prior Publication Data

US 2008/0004807 A1    Jan. 3, 2008

(30) Foreign Application Priority Data

Jun. 28, 2006    (JP) .............................. 2006-178193

(51) Int. Cl.
*B60W 30/08*    (2006.01)
*G08G 1/16*    (2006.01)
(52) U.S. Cl. ..................................... 701/301
(58) Field of Classification Search ......... 701/300–302, 701/96; 340/435–436, 425.5, 903
See application file for complete search history.

(56) References Cited

U.S. PATENT DOCUMENTS 7,734,419 B2 *   6/2010   Kondoh .................... 701/301
2005/0110348 A1   5/2005   Hijikawa et al.
2007/0030132 A1 * 2/2007   Kobayashi et al. .......... 340/436
2007/0032914 A1 * 2/2007   Kondoh et al. ............... 701/1
2007/0050110 A1 * 3/2007   Kondoh et al. .............. 701/36
2007/0272464 A1 * 11/2007  Takae et al. ................ 180/169

FOREIGN PATENT DOCUMENTS

DE    102004022266 A1    12/2005
JP    2003-63430    3/2003

* cited by examiner

*Primary Examiner*—Yonel Beaulieu
(74) *Attorney, Agent, or Firm*—Global IP Counselors, LLP

(57) ABSTRACT

A vehicle driving assist system has a host vehicle risk factor detection section, a peripheral risk factor detection section, a host vehicle risk potential calculation section, a peripheral risk potential calculation section and a risk potential notification section. The host vehicle risk factor detection section detects host vehicle risk factors related to a host vehicle. The peripheral risk factor detection section detects peripheral risk factors in an area around the host vehicle. The host vehicle risk potential calculation section calculates a host vehicle risk potential attributed to the host vehicle risk factors. The peripheral risk potential calculation section calculates a peripheral risk potential attributed to the peripheral risk factors. The risk potential notification section notifies a driver of the host vehicle risk potential and the peripheral risk potential using a common risk notification device for both notifications.

17 Claims, 20 Drawing Sheets

| HOST VEHICLE RISK FACTORS | | | |
|---|---|---|---|
| R11 | INCREASED KINETIC ENERGY FROM HIGHER VEHICLE SPEED (INCREASED DAMAGE DURING UNFORESEEN EVENT) | | CONTINUOUSLY TRANSMIT REACTION FORCE THAT GRADUALLY INCREASES AS THE POTENTIAL RISK INCREASES |
| | | VISIBILITY AND ROAD SURFACE CONDITIONS | |
| | | APPROACH THE ESTABLISHED SPEED LIMIT | |
| | | EXCESSIVE SPEED ON A RESIDENTIAL ROAD, ETC. | |
| R12 | RISKS THAT VIOLATE TRAVEL RULES | | DISCONTINUOUSLY TRANSMIT REACTION FORCE WHEN A POTENTIAL RISK OCCURS |
| | | EXCESSIVE VEHICLE SPEED (VEHICLE SPEED LIMIT DUE TO INFRACSTRUCTURAL, NAVIGATIONAL, OR DRIVER SETTTINGS) | |
| | | RED TRAFFIC SIGNAL, COMPLETE STOP | |
| | | ENTRY NOT PERMITTED (ONE-WAY STREET) | |
| PERIPHERAL RISK FACTORS | | | |
| R22 | EVENT-RELATED RISKS (RAPIDLY CHANGING RISKS) | | DISCONTINUOUSLY TRANSMIT REACTION FORCE WHEN A POTENTIAL RISK OCCURS |
| | | PEDESTRIAN DASHING INTO THE STREET | |
| | | LANE-INTRUDING VEHICLE | |
| | | APPROACH OF A PASSING VEHICLE | |
| R21 | CONTINUOUS RISKS (RISKS THAT DO NOT CHANGE RAPIDLY) | | CONTINUOUSLY TRANSMIT REACTION FORCE THAT GRADUALLY INCREASES AS THE POTENTIAL RISK INCREASES |
| | | APPROACHING A VEHICLE AHEAD | |
| | | APPROACHING ROADSIDE STRUCTURES | |
| | | APPROACHING THE LANE BOUNDARY | |

FIG. 2

VEHICLE DRIVING ASSIST SYSTEM

CROSS-REFERENCE TO RELATED APPLICATIONS

This application claims priority to Japanese Patent Application No. 2006-178193 filed on Jun. 28, 2006. The entire disclosure of Japanese Patent Application No. 2006-178193 is hereby incorporated herein by reference.

BACKGROUND OF THE INVENTION

1. Field of the Invention

The present invention relates to a vehicle driving assist system for assisting driver operations.

2. Background Information

Various vehicle driving assist systems has been proposed to assist a driver with respect to the operation of a host vehicle. An example of a vehicle assist system is disclosed in Japanese Laid-Open Patent Application No. 2003-63430. This vehicle driving assist system detects various obstacles around the host vehicle, and notifies the driver to reduce the frequency at which the host vehicle approaches these obstacles. The vehicle driving assist system in the cited publication generates a reaction force in a driver-operated driving operation device (e.g., an accelerator pedal or a steering wheel), based on a running state of the host vehicle and a traveling environment surrounding the vehicle.

SUMMARY OF THE INVENTION

The vehicle driving assist system cited in the above-described publication is capable of notifying the driver of various risks surrounding the host vehicle by generating a reaction force in a driver-operated driving operation device. However, there are many risk factors that affect the vehicle and it is difficult for the driver to separately ascertain a plurality of risk factors from an accelerator pedal operation reaction force or a steering reaction force.

In accordance with one aspect of the present invention, a vehicle driving assist system is provided that basically comprises a host vehicle risk factor detection section, a peripheral risk factor detection section, a host vehicle risk potential calculation section, a peripheral risk potential calculation section and a risk potential notification section. The host vehicle risk factor detection section is configured to detect host vehicle risk factors related to a host vehicle. The peripheral risk factor detection section is configured to detect peripheral risk factors in an area around the host vehicle. The host vehicle risk potential calculation section is configured to calculate a host vehicle risk potential attributed to the host vehicle risk factors that are detected by the host vehicle risk factor detection section. The peripheral risk potential calculation section is configured to calculate a peripheral risk potential attributed to the peripheral risk factors that are detected by the peripheral risk factor detection section. The risk potential notification section is configured to notifying a driver of the host vehicle risk potential calculated by the host vehicle risk potential calculation section with a host vehicle risk potential notification and the peripheral risk potential calculated by the peripheral risk potential calculation section with a peripheral risk potential notification using a common risk notification device for both the host vehicle risk potential notification and the peripheral risk potential notification.

The vehicle driving assist system according to the present invention comprises host vehicle risk factor detection section for detecting risk factors (hereinafter referred to as host peripheral risk factors) related to a host vehicle; peripheral risk factor detection section for detecting risk factors (hereinafter referred to as peripheral risk factors) in an area around the host vehicle.

BRIEF DESCRIPTION OF THE DRAWINGS

Referring now to the attached drawings which form a part of this original disclosure:

FIG. 2 is a table of potential risks used by the vehicle driving assist system;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
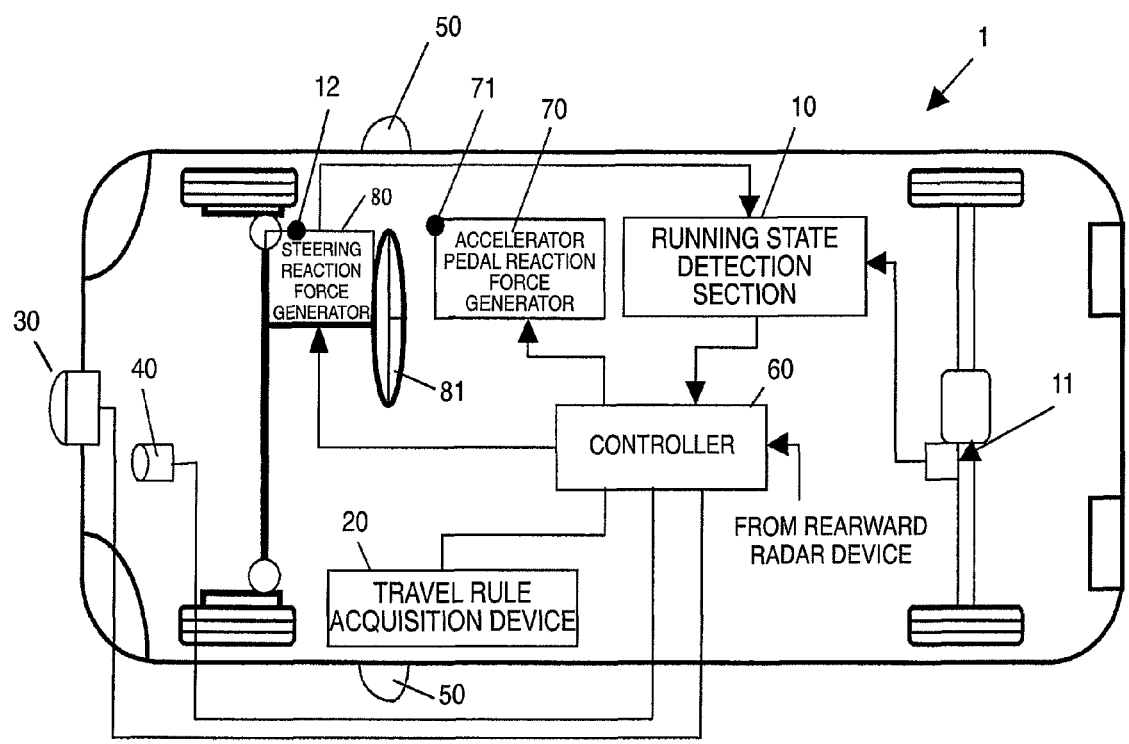
FIG. 1 is a simplified diagrammatic view of a vehicle in which the vehicle driving assist system is installed in accordance with a first embodiment of the present invention.

Referring initially to FIG. 1, a host vehicle is illustrated that is equipped with a vehicle driving assist system 1 in accordance with a first embodiment of the present invention. The vehicle driving assist system 1 basically includes, among other things, a vehicle running state detection section 10, a travel rule acquisition section 20, a laser radar device 30, a camera device 40, a pair of rearward radar devices 50, a controller 60, an accelerator pedal reaction force generator 70 and a steering reaction force generator 80. As explained below in greater detail, the vehicle driving assist system 1 detects a plurality of risk factors related to the host vehicle and then distinctly notifies the driver in a manner that is easy to perceive which of the risk factors is being indicated. For example, as seen in FIG. 2, in the illustrated embodiment, at least four different types of risk potentials R11, R12, R21 and R22 are detected and indicated to the driver. The risk potential R11 includes host vehicle risk factors that are attributed to the kinetic energy of the host vehicle. The risk potential R11 is typically calculated based on the information related to the running state of the host vehicle. The risk potential R12 includes host vehicle risk factors that are attributed to a travel rule(s) affecting the host vehicle. The risk potential R12 is typically calculated based on the road related information (road attributes) such as roads on which travel is not permitted, recommended speed, etc. The risk potential R21 includes host vehicle risk factors that are attributed to relatively constant travel conditions surrounding the host vehicle such as surrounding vehicles moving at a relatively constant speed, stationary obstacles, etc. The risk potential R21 is calculated based on information detected relating to the travel conditions surrounding the host vehicle. The risk potential R22 includes host vehicle risk factors that are attributed to suddenly occurring event-related travel conditions surrounding the host vehicle such as a pedestrian running into the street, a surrounding vehicle moving suddenly into the host vehicles travel lane, etc. The risk potential R21 is calculated based on information detected relating to the travel conditions surrounding the host vehicle.

The vehicle running state detection section 10 detects the running state of the host vehicle. The vehicle running state detection section 10 includes a vehicle speed sensor 11, a steering angle sensor 12, and the like. The vehicle speed sensor 11 detects the speed of the host vehicle by measuring the rotational speed of the wheels or the rotational speed on the output side of the transmission. The steering angle sensor 12 is an angle sensor that is mounted in the vicinity of, e.g., a steering column or a steering wheel 81, and that detects the steering angle produced when the driver turns the steering wheel 81 and causes the steering column to rotate. The vehicle running state detection section 10 is further provided with sensors that detect the yaw rate, the lateral acceleration, and forward/rearward acceleration of the host vehicle.

The travel rule acquisition section 20 acquires information related to the travel rule to be followed when the host vehicle is traveling on a road. For example, the travel rule acquisition section 20 includes a navigation system for guiding the host vehicle. The navigation system is provided with a recommended speed database that is associated with map information. In this case, the recommended speed is based on the speed limit of the road on which the host vehicle is traveling. The speed limit of the road is set as the speed recommended for traveling so that the host vehicle does not exceed the upper speed limit. Thus, the recommended speed is a set as a travel rule for that road by the travel rule acquisition section 20. Also, the travel rule acquisition section 20 acquires the recommended speed information, information on roads on which travel is not permitted, and other information from the navigation system in accordance with the traveling position of the host vehicle. Form this information, the travel rule acquisition section 20 sets a travel rule (including one or more factors) for the host vehicle.

The laser radar device 30 is mounted to a front grill portion, a bumper portion, or the like of the host vehicle and serves to horizontally scan a region in front of the host vehicle with an infrared light pulse. The laser radar device 30 then measures the reflected light resulting from the infrared light reflecting off of a plurality of reflecting objects located in front of the host vehicle (normally, the rear ends of preceding vehicles). By measuring the time required for the reflected light to arrive, the laser radar device 30 detects the relative speed, the headway distance and existence direction to a plurality of preceding vehicles. The detected relative speed, headway distances and existence directions are sent to the controller 60. In this embodiment, the existence directions of preceding objects can be expressed as a relative angle with respect to the vehicle in which the vehicle driving assist system is installed. The region in front of the host vehicle scanned by the laser radar device 30 is, for example, ±6 degrees with respect to the front of the host vehicle and the system detects preceding objects existing within this angular range.

The camera device 40 is provided with, e.g., a small CCD camera, a CMOS camera, or another camera mounted on the upper portion of the front window, and the device images and detects the conditions of the road ahead. Specifically, the camera device 40 detects lane markers on the road, and measures the position of the host vehicle in the lane by processing the image. The signals from the camera device 40 are outputted to the controller 60. The area detected by the camera device 40 is about ±30 degrees in the horizontal direction with respect to the center line in the forward direction of the host vehicle, and the scenery of the road ahead located in this range is imaged.

The rearward radar devices 50 are provided with a radar that is mounted, e.g., in the vicinity of the side mirrors on the left and right side of the host vehicle. The rearward radar devices 50 direct radio waves to the right and rear and to the left and rear directions of the host vehicle to detect vehicles approaching from behind, and measure the relative speed and the headway distance between the host vehicle and the approaching vehicle.

The controller 60 is composed of a CPU, a ROM, a RAM, and other CPU peripheral components, and controls the entire vehicle driving assist system 1. Specifically, the controller 60 calculates, based on information related to the running state of the host vehicle inputted from the vehicle running state detection section 10 and information related to the travel rule(s) imputed from the travel rule acquisition section 20, the risk potentials R11 and R12 attributed to the host vehicle. The risk potentials R21 and R22 attributed to the conditions in the area round the host vehicle are calculated based on the state of obstacles in an area around the host vehicle inputted from the laser radar device 30, the camera device 40, and the rearward radar devices 50. Also calculated are the reaction force incrementally generated in the accelerator pedal 71 and the reaction force incrementally generated in the steering wheel 81 on the basis of risk potentials R11, R12, R21, and R22, respectively.

The accelerator pedal reaction force generator 70 incrementally generates operation reaction force in the accelerator pedal 71 in accordance with the command value from the controller 60. The accelerator pedal reaction force generator 40 is provided with a servomotor (not shown) incorporated, for example, into the link mechanism of the accelerator pedal 71. The accelerator pedal reaction force generator 70 controls the torque generated by the servomotor in accordance with the reaction force command value. The servomotor is a reaction force actuator that generates operation reaction force and that is capable of arbitrarily controlling the operation reaction force (depression force) generated when the driver operates the accelerator pedal 71. The base reaction force characteristics (see FIG. 11) of a case in which the reaction force is not under the control of the accelerator pedal reaction force generator 70 is set so that a greater reaction force is generated as the depression value of the accelerator pedal 71 is increased by the spring force of a return spring (not shown), for example.

The steering reaction force generator 80 is incorporated into the steering system of the vehicle. The steering reaction force generator 80 is used to incrementally generate steering reaction force in the steering wheel 81 in accordance with the command value from the controller 60. The steering reaction force generator 80 is provided with a servomotor (not shown) that is used to control the torque generated by the servomotor in accordance with the command value. The servomotor is capable of using torque control to arbitrarily control the steering reaction force generated when the driver operates the steering wheel 81.

Next, the operation of the vehicle driving assist system 1 according to the first embodiment will be described. First, an outline will be provided.

Various risks are generated when the host vehicle is traveling. The generated risk-factors include obstacle related risk factors and non-obstacle related risk factors. The obstacle related risk factors include the state of obstacles in an area around the host vehicle, obstacles in which the magnitude of the risk continuously changes (continuous risk factors), and obstacles in which the magnitude of the risk suddenly changes (event-related risk factors). The other non-obstacle related risk factors include, but not limited to, risks brought about by the kinetic energy of the host vehicle and the travel rule that are related to the host vehicle but unrelated to obstacles in the area around the host vehicle. When, for example, the vehicle speed increases and greater kinetic energy is produced, these factors will have greater effect in that more time is required to stop the vehicle in an unforeseen situation. Therefore, kinetic energy and the physical amount of the kinetic energy can be risk factors attributed to the host vehicle. Travel rule (traffic rules) are generally artificially imposed rules, and the travel rule can also be a risk factor attributed to the host vehicle because there is a greater possibility that an unforeseen situation will occur when the vehicle is running without following the travel rule. The term "travel rule" as used herein includes a single risk factor and a plurality of risk factors. In other words, two travel rules can be collectively considered as a single travel rule.

FIG. 2 shows a table of risks generated by the host vehicle and risks generated by the state of obstacles and other factors in the area around a vehicle. In the first embodiment, the risk produced by an increase in kinetic energy and the risk produced when the host vehicle travels in manner that is not in accordance with travel rule are calculated as respective risk potentials R11 and R12 that are attributed to factors related to the host vehicle. Also, continuous risks that change gradually are calculated as risk potential R21 that is attributed to factors in an area around the host vehicle when the host vehicle and obstacles present in an area around the host vehicle come into close proximity. Also rapidly changing event-related risks produced by lane-intruding vehicles and other factors are calculated as risk potential R22 that is attributed to factors in an area around the host vehicle.

The risk potentials R11, R12, R21, and R22 are values set in order to represent as physical values the magnitude of potential risks of the host vehicle. These risk potentials are values that increase in magnitude as potential risks increase in magnitude. The risk potentials R11, R12, R21, and R22 are indicated to the driver by incrementally generating, based on the risk potentials R11, R12, R21, and R22, an operation reaction force in the accelerator pedal 71 and the steering wheel 81.

However, when several different risk potentials R11, R12, R21, and R22 are simultaneously indicated using the same operation reaction force, it is difficult for the driver to know what the risk factor is. In view of this fact, the method for generating an operation reaction force is modified when risk potentials having different risk factors are indicated. The driver can easily know by way the pedal operation reaction force or steering reaction force are occurring that risks having different factors.

Figure 3:
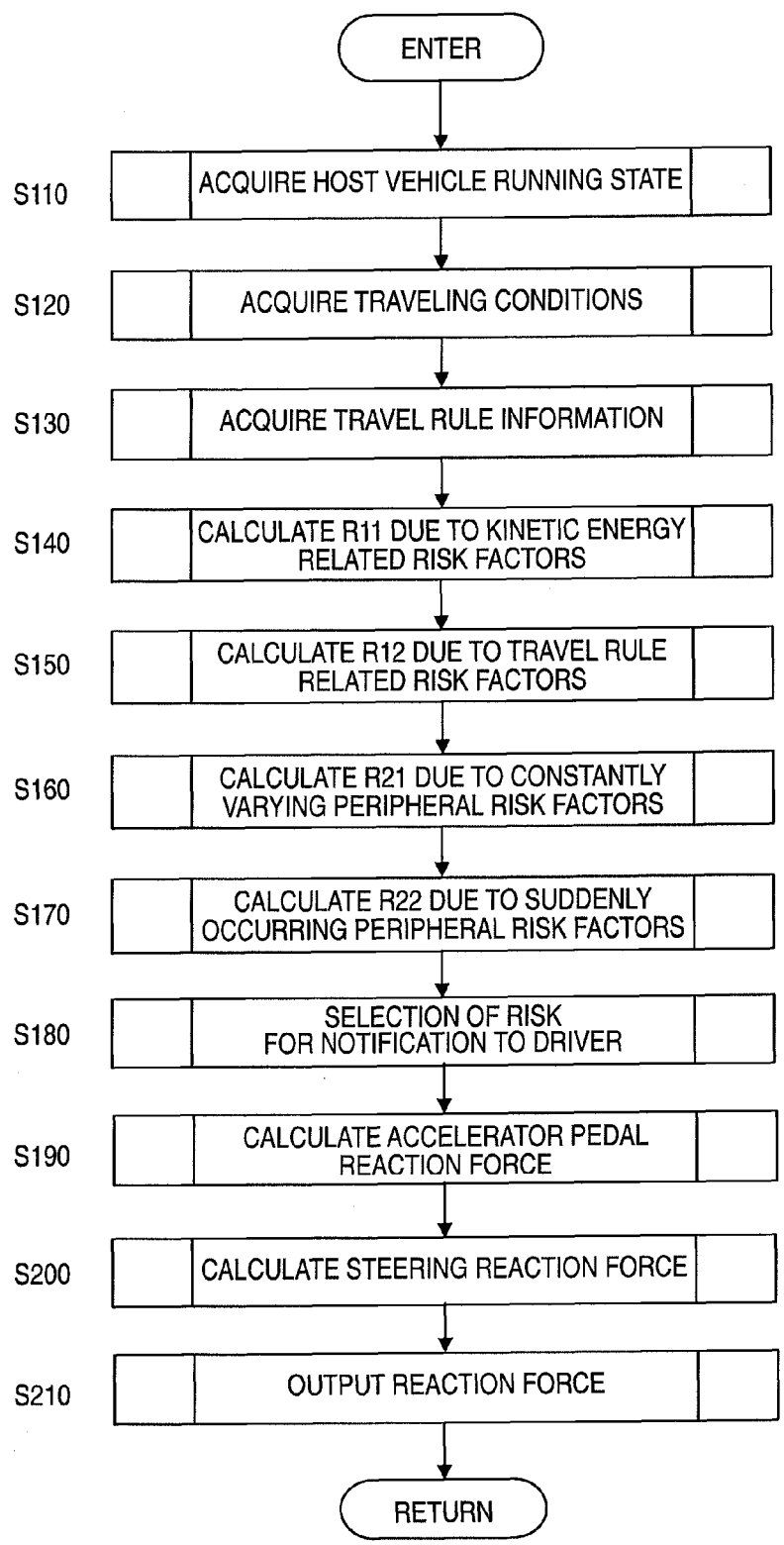
FIG. 3 is a flowchart showing the control processing steps executed by a vehicle driving assist control program according to the first embodiment.

The operation of the vehicle driving assist system 1 according to the first embodiment is described in detail below with reference to FIG. 3. FIG. 3 is a flowchart showing a processing sequence for a vehicle drive operation assist control program in the controller 60. The processing steps are carried out in a continuous fashion at fixed intervals (50 msec, for example).

In step S110, the vehicle running state detection section 10 acquires physical values representing the vehicle running state, i.e., the host vehicle speed V, steering angle δ, yaw rate θ, lateral acceleration ay, and forward/rearward acceleration ax.

In step S120, the laser radar device 30 acquires, as physical values that represent traveling conditions in an area around the host vehicle, the headway distance X_P, and the relative speed Vr_P between the host vehicle and the preceding vehicle in front of the host vehicle. Also in step S120, the camera device 40 acquires the lateral offset value Y_C of the host vehicle in a lane. Also in step S120, the rearward radar devices 50 detect rearward vehicles that are traveling behind and to the side of the host vehicle, and acquire the headway distance X_R and the relative speed Vr_R between the host vehicle and a rearward vehicle.

Figure 4:
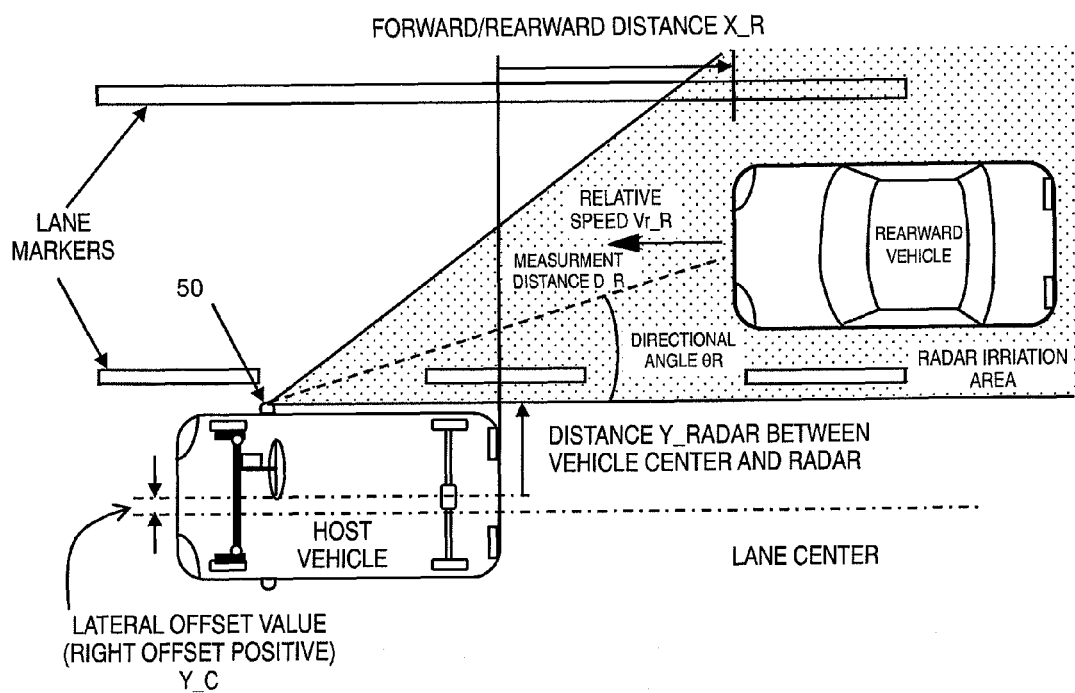
FIG. 4 is a simplified schematic diagram illustrating a method for detecting a rearward vehicle with the aid of a rearward radar device.

Here, the method by which the rearward radar devices 50 detect a rearward vehicle will be described with reference to FIG. 4. FIG. 4 shows the case in which a rearward vehicle is present in a lane that is adjacent on the right side of the host vehicle. The rearward radar devices 50 on the right side detect the rearward vehicle present in the hatched radar radiation area, and measures the forward/rearward distance (headway distance) X_R and the relative speed Vr_R between the rearward vehicle and the host vehicle. The forward/rearward distance X_R is the distance in the forward/rearward direction from the rear end of the host vehicle to the front end of the rearward vehicle, and the relative speed Vr_R is expressed as a positive value when the rearward vehicle is approaching the host vehicle.

The distance D_R to the front end of the rearward vehicle is measured by the rearward radar devices 50, with a directional angle θR being the measurement direction of the measured distance D_R in the forward/rearward direction of the host vehicle. The distance Y_RADAR is the distance from the center of the host vehicle to the rearward radar devices 50, and the distance Y_C is the lateral offset value from the lateral position in the lane, i.e. from the center of the traffic lane to the center of the host vehicle as measured by the camera device 40. Therefore, the lateral distance Y from the center of the lane of the host vehicle to the rearward vehicle can be calculated using Equation 1 below.

$$Y=D\_R \cdot \sin(\theta R)+Y\_RADAR+Y\_C \text{(rearward vehicle on right side)}$$

$$Y=D\_R \cdot \sin(\theta R)+Y\_RADAR-Y\_C \text{(rearward vehicle on right side)} \quad (1)$$

The lateral offset value Y_C is expressed as a positive value when the center of the host vehicle is positioned to the right side of the center of the traffic lane.

When the lateral distance Y calculated from Equation 1 satisfies the following relationship (2), it is determined that the detected rearward vehicle is another vehicle traveling in an adjacent lane to the right or to the left. W_L is the width of a traffic lane.

$$W\_L/2<Y<W\_L3/2 \quad (2)$$

In step S130, the travel rule acquisition section 20 acquires, as part of the travel rule, the non-obstacle related risk factors such as travel rule information related to the recommended speed of the road on which the host vehicle is currently traveling and information related to roads on which travel is not permitted. Specifically, the coordinates (latitude and longitude) of the current position of the host vehicle are detected in the navigation system, and the road on which the host vehicle is currently traveling is identified based on map information. The road information (road attributes), including the recommended speed, is acquired for the road on which the host vehicle is currently traveling. Also the travel rule acquisition section 20 acquires, as part of the travel rule, information related to branching roads that are ahead in the direction in which the host vehicle is traveling (including information related to roads on which travel is not permitted). Thus, information is obtained to formulate a travel rule, which can be composed of a single factor or multiple factors.

In step S140, the risk potential R11 due to the host vehicle risk factors attributed to the kinetic energy of the host vehicle is calculated based on the information related to the running state of the host vehicle acquired in step S110. Calculated in this case are the risk potential R11_X in the forward/rearward direction related to the forward/rearward directional movement of the host vehicle, and the risk potential R11_Y in the left/right direction related to lateral movement.

Figure 5:
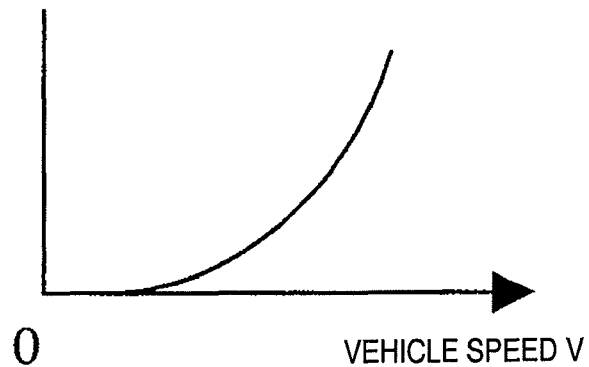
FIG. 5 is a diagram showing the relationship between the host vehicle speed and the risk potential in the forward/rearward direction attributed to kinetic energy.
Figure 6:
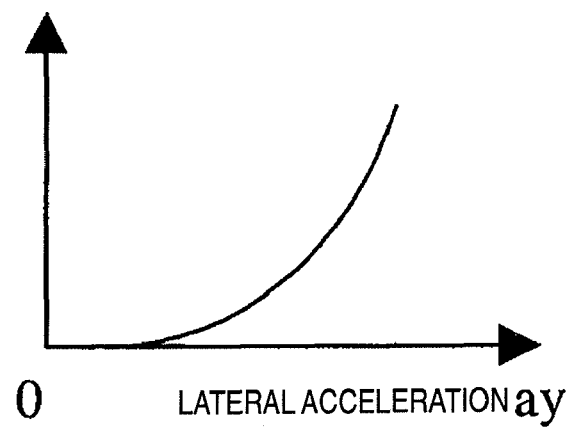
FIG. 6 is a diagram showing the relationship between the lateral acceleration and the risk potential in the left/right direction attributed to kinetic energy.

The risk potential R11_X in the forward/rearward direction is calculated based on the vehicle speed V, for example. FIG. 5 shows the relationship between the vehicle speed V and the risk potential R11_X in the forward/rearward direction. The risk potential R11_X in the forward/rearward direction increases exponentially with increased host vehicle speed V, i.e., increased kinetic energy in the forward/rearward direction. The risk potential R11_Y in the left/right direction is calculated based on the lateral acceleration ay of the host vehicle, for example. FIG. 6 shows the relationship between the lateral acceleration ay and the risk potential R11_Y in the left/right direction. The risk potential R11_Y in the left/right direction increases exponentially with increased lateral acceleration ay i.e., increased kinetic energy in the left/right direction. The lateral acceleration ay is expressed by a positive value when the lateral acceleration is in the right direction and by a negative value when the lateral acceleration is in the left direction. The absolute value of lateral acceleration ay is used when the risk potential R11_Y in the left/right direction is calculated.

In step S150, the risk potential R12 of host vehicle risk factors attributed to the travel rule of the host vehicle is calculated based on the road information (road attributes) such as roads on which travel is not permitted and the recommended speed acquired in step S130. Calculated in this case are the risk potential R12_X in the forward/rearward direction that is based on the recommended speed information, and the risk potential R12_Y in the left/right direction that is based on the information related to roads on which travel is not permitted. When the host vehicle speed V has exceeded the recommended speed, it is determined that the risk is high in the forward/rearward direction of the vehicle and risk potential R12_X in the forward/rearward direction is set to 1. When the host vehicle speed V is equal to or less than the recommended speed, it is determined that the risk is low and R12_X is set to zero.

The risk potential R12_Y in the left/right direction is calculated based on whether the road ahead of the host vehicle is a road on which travel is not permitted. In view of this calculation, a determination is first made based on the steering angle δ acquired in step S110 as to whether the host vehicle is attempting a left or right turn. When the host vehicle is attempting to make a right turn but the road resulting from the right turn is a road on which travel is not permitted, it is determined that the risk in the right direction is considerable and R12_Y is set to 1. On the other hand, when the host vehicle is attempting to make a left turn but the road resulting from the left turn is a road on which travel is not permitted, it is determined that the risk in the left direction is considerable and R12_Y is set to −1. In cases other than these, the risk is determined to be low and R12_Y=0 when the roads resulting from a left or right turn are not roads on which travel is not permitted or when the host vehicle is traveling straight ahead.

In step S160, the risk potential R21 of the continuous peripheral risk factors is calculated based on conditions of the area around the vehicle that are acquired in step S120. In this case, the risk potential R21_X in the forward/rearward direction related to the movement of the host vehicle in the forward/rearward direction, and the risk potential R21_Y in the left/right direction related to movement in the left/right direction are calculated based on the proximity of the host vehicle to obstacles present in an area around the host vehicle. An example of an obstacle present in an area around the host vehicle is a preceding vehicle present in the lane of the host vehicle, and the risk potential R21_X in the forward/rearward direction is calculated for the preceding vehicle. First, the time to headway THW and the time to collision TTC between the host vehicle and the preceding vehicle are calculated.

The time to collision TTC with the preceding vehicle is a physical value showing the current proximity of the host vehicle to the preceding vehicle, and is a value that shows how many seconds must elapse before the headway distance X_P would become zero and the host vehicle and preceding vehicle would make contact when current running conditions are kept the same, i.e., when the host vehicle speed V and the relative speed Vr_P are constant. The relative speed Vr_P is calculated by subtracting the preceding vehicle speed from the host vehicle speed, and when the preceding vehicle speed is greater than the host vehicle speed V, the relative speed Vr_P is set to zero. The time to collision TTC with the preceding vehicle is calculated using the following Equation 3.

$$TTC = X\_P/Vr\_P \quad (3)$$

The smaller the value of the time to collision TTC is, the more imminent the collision with the preceding vehicle is the greater the proximity to the preceding vehicle is. For example, it is known that most drivers will begin to decelerate before the time to collision TTC reaches 4 seconds or less when the driver's vehicle is approaching a preceding vehicle.

The time to headway THW is a physical value that shows, for the case in which the host vehicle is following a preceding vehicle, the effect on the time to collision TTC of changes in the predicted future speed of the preceding vehicle, i.e., the effect when the relative speed Vr_P is presumed to have changed. The time to headway THW is expressed by the following Equation 4.

$$THW = X\_P/V \quad (4)$$

The time to headway THW is obtained by dividing the headway distance X_P by the host vehicle speed V, and shows the time until the host vehicle arrives at the current position of the preceding vehicle. The greater the time to headway THW is, the smaller the predicted effect on the changes in the peripheral environment. In other words, when the time to headway THW is considerable, there is little effect on the proximity to the preceding vehicle even if the speed of the preceding vehicle were to change in the future, and there would be little change in the time to collision TTC. When the speeds of the vehicle speed and preceding vehicle are the same, the time to headway THW may be calculated using the speed of obstacles in place of the host vehicle speed V in Equation 4.

Next, the risk potential R21_X in the forward/rearward direction is calculated using Equation 5 below with the aid of the time to collision TTC and time to headway THW.

$$R21\_X = A/THW + B/TTC \quad (5)$$

In the formula, A and B are constants for suitably weighting the reciprocals of the time to headway THW and the time to collision TTC, and are set in advance to suitable values, e.g., A=1 and B=8 (A<B).

Figure 7:
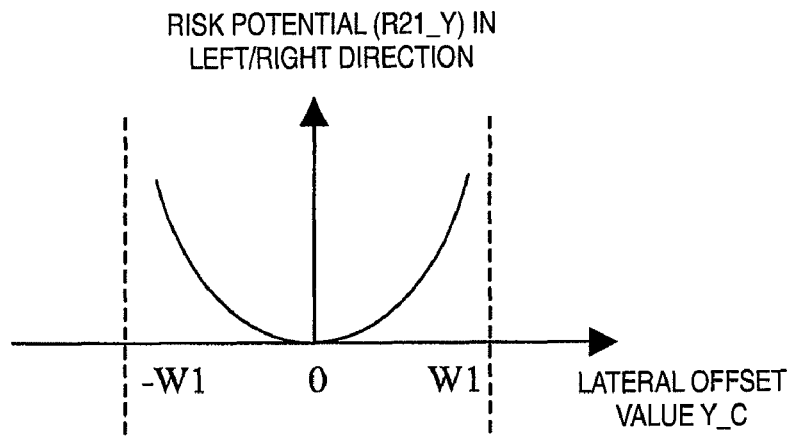
FIG. 7 is a diagram showing the relationship between the amount of lateral offset from the center of the lane in which the host vehicle is traveling and the left/right risk potential attributed to factors in an area around the host vehicle.

The proximity to the lane boundary is calculated as the risk potential R21_Y in the left/right direction on the basis of the lateral offset value Y_C from the center of the lane. FIG. 7 shows the relationship between the lateral offset value Y_C and the risk potential R21_Y in the left/right direction. When the lateral offset value Y_C=0 and the center of the vehicle is in the center of the lane, R21_Y is set to zero. The risk potential R21_Y in the left/right direction increases as the center of the vehicle approaches the lane boundary. The prescribed value W1 is an offset value that is used when the right-side tire of the host vehicle has made contact with the right-side lane marker, −W1 is an offset value that is used when the left-side tire of the host vehicle has made contact with the left-side lane marker.

In the subsequent step S170, the risk potential R22 of suddenly occurring event-related peripheral risk factors is calculated based on conditions in an area around the host vehicle that were acquired in step S120. Calculated in this case are the risk potential R22_X in the forward/rearward direction related to movement of the host vehicle in the forward/rearward direction, and the risk potential R22_Y in the left/right direction related to movement in the left/right direction. The method for calculating the risk potential R22_X in the forward/rearward direction is described first with reference to FIG. 8.

Figure 8:
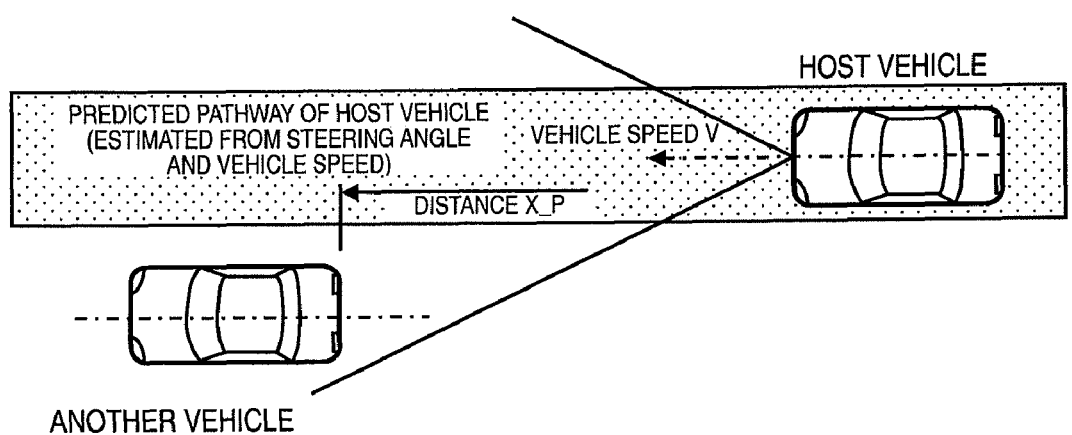
FIG. 8 is a simplified schematic diagram illustrating a method for determining that a lane-intruding vehicle that is changing lanes into the predicted pathway of the host vehicle.

When another vehicle has intruded ahead of the host vehicle, for example, the proximity of the host vehicle to the intruding vehicle rapidly increases. Therefore, the intruding vehicle is an event-related risk factor related to the forward/rearward direction of the host vehicle. An intruding vehicle is determined in the following manner. In FIG. 8, the hatched area is the predicted pathway of the host vehicle estimated from the steering angle δ and host vehicle speed V. When another vehicle is within the detectable range of the laser radar device 30 ahead of the host vehicle but is not yet within the predicted pathway of the host vehicle, the proximity of the host vehicle to the other vehicle is calculated. For example, the time to headway THW (=X_P/V) or the time to collision TTC (=X_P/Vr_P) between the host vehicle and the other vehicle are used as the measurements of proximity.

Another vehicle is determined to be an intruding vehicle in a case in which the other vehicle has changed course into the predicted pathway of the host vehicle under conditions in which the approach is one in which the proximity of the host vehicle to the other vehicle is not likely to occur under normal travel conditions when the time to headway THW is a prescribed value, e.g., 0.5 seconds or less, and the time to collision TTC is a prescribed value, e.g., 3 seconds or less. When another vehicle is determined to be an intruding vehicle, the event-related risk in the forward/rearward direction is determined to be high and R22_X is set to 1. When an intruding vehicle is not present, R22_X is set to 0.

The event-related risk related to another vehicle that is in an adjacent lane and is approaching from the rear is calculated at the risk potential R22_Y in the left/right direction. Specifically, the approach to the host vehicle is determined using the headway distance X_R and the relative speed Vr_R calculated in step S120 with respect to the rearward vehicle that has been determined from Equation 2 described above to be a vehicle in an adjacent lane.

When the time to collision TTC (=X_R/Vr_R) between the host vehicle and the rearward vehicle is less than a prescribed value TTC_R_TH, or when the forward/rearward distance X_R is less than a prescribed value XR_TH1, the risk of the approaching rearward vehicle is determined to be considerable. In this case, R22_Y is set to 1 when a rearward vehicle is present in the adjacent lane to the right, and R22_Y is set to −1 when a rearward vehicle is present in the adjacent lane to the left. When the inequality X_R<VR_R<TTC_R_TH or the inequality X_R<XR_TH1 is not satisfied, the risk of the approaching rearward vehicle is determined to be low and R22_Y is set to zero.

In the subsequent step S180, the risk potential to be indicated to the driver by way of the operation reaction force is selected from the risk potentials calculated in steps S140 to S170. These risk potentials include the risk potential R11 attributed to kinetic energy and the risk potential R12 attributed to the travel rule of the host vehicle, as well as the continuous risk potential R21 and the event-related risk potential R22 of the peripheral risk factors.

First, the larger of the risk potential values selected from the risk potential R11 attributed to kinetic energy of the host vehicle risk factors and the continuous risk potential R21 of the peripheral risk factors is selected as the risk potential R1 used for continuous reaction force output. Specifically, the risk potential R1_X in the forward/rearward direction and the risk potential R1_Y in the left/right direction are selected from the following Equation 6.

$$R1\_X=\max\{R11\_X, R21\_X\}$$
$$R1\_Y=\max\{R11\_Y, R21\_Y\} \quad (6)$$

In Equation 6, the term "max" is a function for selecting the greater of two values.

Second, the larger of the risk potential values selected from the risk potential R12 attributed to travel rule violation of the host vehicle risk factors and the event-related risk potential R21 of the peripheral risk factors is selected as the risk potential R2 used for discontinuous reaction force output. Specifically, the risk potential R2_X in the forward/rearward direction and the risk potential R2_Y in the left/right direction are selected in the following manner.

When the event-related risk potential R22_X in the forward/rearward direction is equal to zero, the risk potential R12_X in the forward/rearward direction attributed the travel rule is selected as the risk potential R2_X (R2_X=R12_X). Conversely, the risk potential R2_X is equal to the event-related risk potential R22_X when the event-related risk potential R22_X in the forward/rearward direction is equal to 1. When the event-related risk potential R22_Y in the left/right direction is equal to zero, the risk potential R12_Y in the left/right direction attributed to the travel rule is selected as the risk potential R2_Y (R2_Y=R12_Y). Conversely, the risk potential R2_Y is equal to the event-related risk potential R22_Y when the event-related risk potential R22_Y in the left/right direction is equal to 1.

Figure 9:
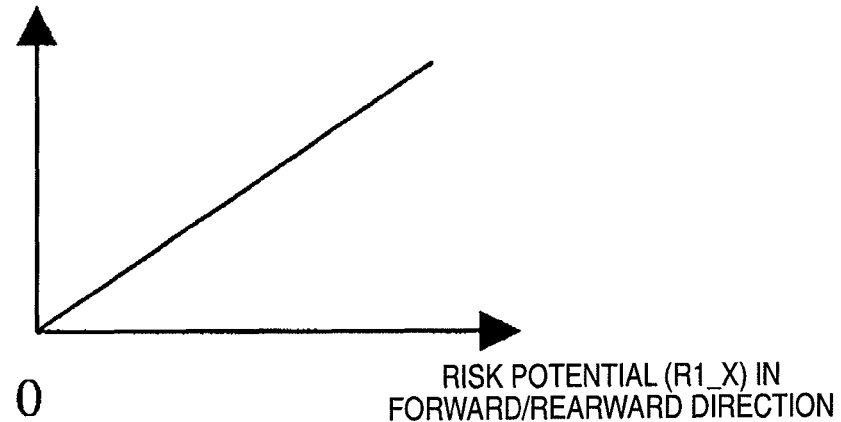
FIG. 9 is a diagram showing the relationship between the reaction force control variable and the risk potential in the forward/rearward direction.

In step S190, the reaction force command value F_AP of the operation reaction force added to the accelerator pedal 71 is calculated based on the risk potentials R1_X and R2_X in the forward/rearward direction selected in step S180. First, the reaction force control variable F_AP_1 is calculated based on the risk potential R1_X in the forward/rearward direction used for continuous reaction force output. The reaction force control variable F_AP_1 is set so as to increase with increased risk potential R1_X in the forward/rearward direction, as shown in FIG. 9.

Next, the reaction force control variable F_AP_2 is calculated based on the risk potential R2_X in the forward/rearward direction used for discontinuous reaction force output. When the risk potential R2_X in the forward/rearward direction is equal to 1, the reaction force control variable F_AP_2 is set to F1, and when the risk potential R2_X is equal to zero, the reaction force control variable F_AP_2 is set to zero. The prescribed value F1 is set to a value that allows the driver to clearly perceive a change in reaction force when F1 is added to the operation reaction force.

The accelerator pedal command value F_AP is calculated from the following Equation (7) on the basis of the reaction force control variables F_AP_1 and F_AP_2.

$$F\_AP=F\_AP\_1+F\_AP\_2 \quad (7)$$

Figure 10:
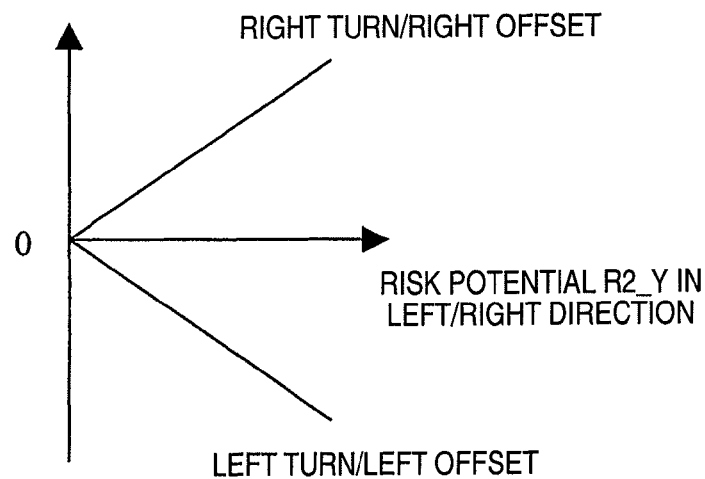
FIG. 10 a diagram showing the relationship between the torque control variable and the risk potential in the left/right direction.

In step S200, the torque command value T_ST added to the steering wheel 81 is calculated based on the risk potentials R1_Y and R2_Y in the left/right direction selected in step S180. First, the torque control variable T_ST_1 is calculated based on the risk potential R1_Y in the left/right direction used for continuous reaction force output. FIG. 10 shows the relationship between the risk potential R1_Y in the left/right direction and the torque control variable T_ST_1. It is detected from the steering angle δ whether the host vehicle is turning right or left, and when the host vehicle is turning right, the torque control variable T_ST_1 increases in the positive direction as the risk potential R1_Y in the left/right direction increases. The same applies to the case in which the center of the vehicle is offset from the center of the lane in the direction to the right. When the host vehicle is turning left or when the vehicle center is offset in the left direction from the center of the lane, the torque control variable T_ST_1 increases in the negative direction as the risk potential R1_Y in the left/right direction increases.

Next, the torque control variable T_ST_2 is calculated based on the risk potential R2_Y in the left/right direction used for discontinuous reaction force output. When the risk potential R2_Y in the left/right direction is equal to zero, the torque control variable T_ST_2 is set to zero. When the risk potential R2_Y in the left/right direction is equal to 1, i.e., when the road to the right is a road on which travel is not permitted or when a rearward vehicle is approaching in the right-adjacent lane, the torque control variable T_ST_2 is set to T1. When the risk potential R2_Y in the left/right direction is equal to −1, i.e., when the road to the left is a road on which travel is not permitted or when a rearward vehicle is approaching in the left-adjacent lane, the torque control variable T_ST_2 is set to −T1. The prescribed values T1 and −T1 are set to a value that allows the driver to clearly perceive a change in reaction force when T1 or −T1 is added to the steering torque.

The torque command value T_ST is calculated from the following Equation (8) on the basis of the torque command values T_ST_1 and T_ST_2.

$$T\_ST=T\_ST\_1+T\_ST\_2 \quad (8)$$

When the torque command value T_ST is a positive value, a steering reaction force is generated in the direction that returns the steering wheel 81 to the left, and when the value is negative, a steering reaction force is generated in the direction that returns the steering wheel to the right.

Figure 11:
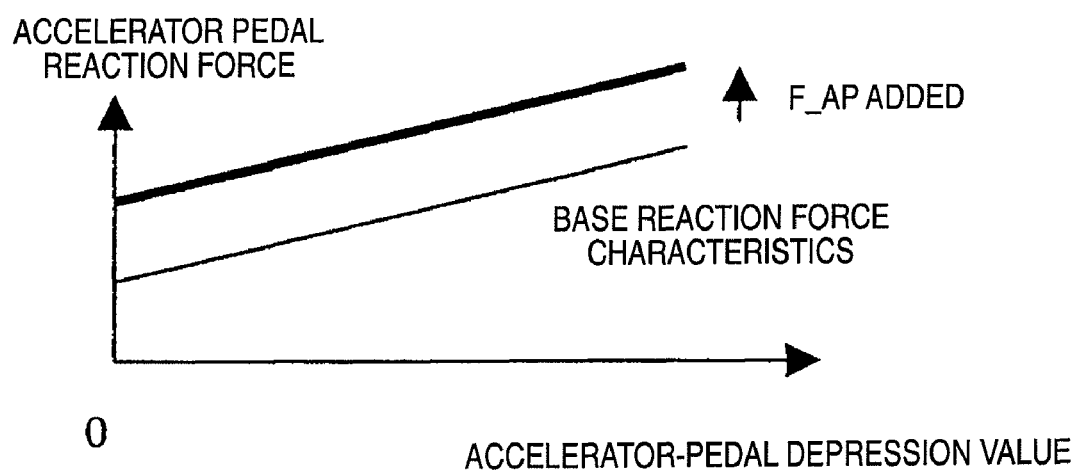
FIG. 11 is a diagram showing the operation reaction force generated in the accelerator pedal.

In the subsequent step S210, the accelerator pedal reaction force command value F_AP calculated in step S190 and the torque command value T_ST calculated in step S200 are outputted to the accelerator pedal reaction force generator 70 and the steering reaction force generator 80, respectively. The accelerator pedal reaction force generator 70 controls the servomotor in accordance with the reaction force command value F_AP inputted from the controller 60, and controls the operation reaction force generated when the driver operates the accelerator pedal 71. A value that results from adding the reaction force command value F_AP to the base reaction force characteristics that correspond to the accelerator-pedal depression value is thereby generated as the accelerator pedal operation reaction force, as shown in FIG. 11.

Figure 12:
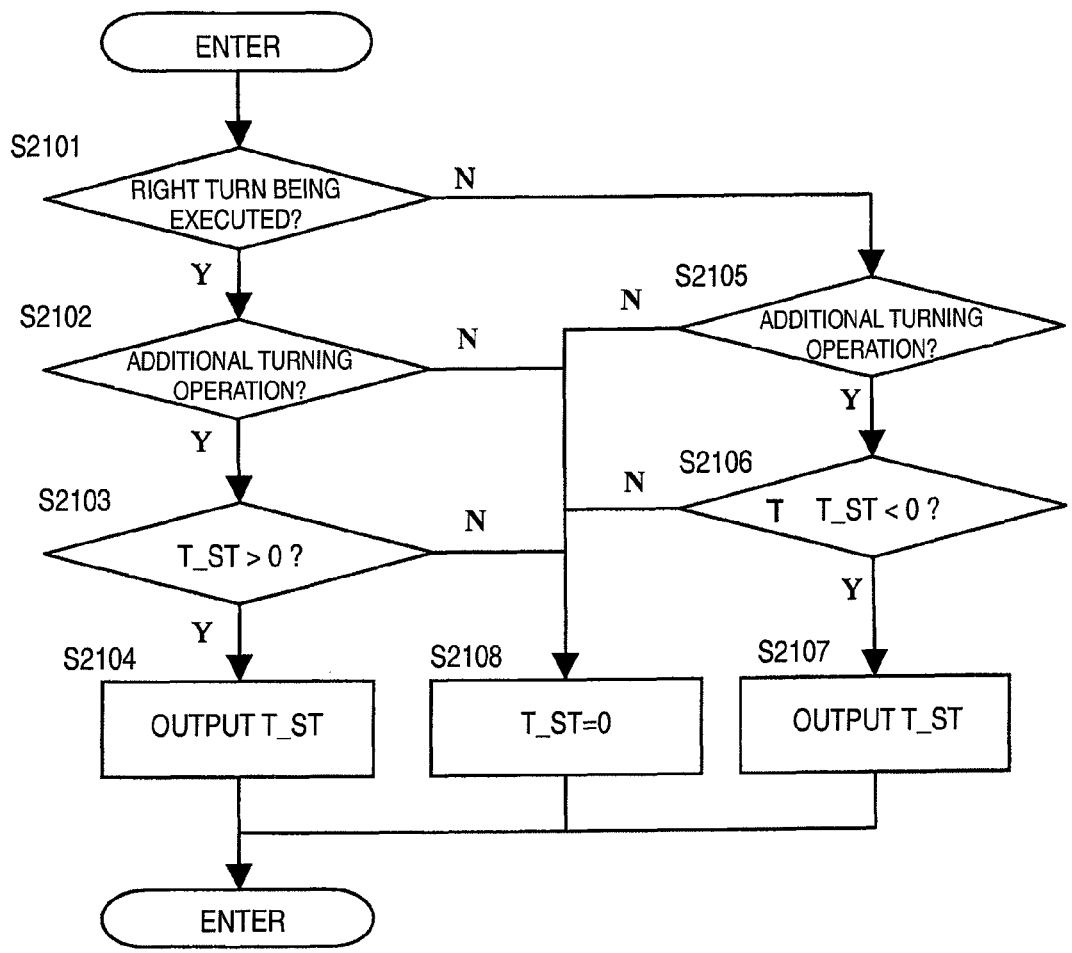
FIG. 12 is a flowchart showing the control processing steps executed for outputting the torque command value.

The steering reaction force generator 80 controls the servomotor in accordance with the torque command value T_ST inputted from the controller 60, and controls the steering reaction force generated when the driver steers the steering wheel 81. The processing sequence used when the controller 60 outputs the torque command value T_ST to the steering reaction force generator 80 will be described with reference to the flowchart of FIG. 12.

In step S2101, a determination is made based on the steering angle δ as to whether the host vehicle is being turned to the right. When a right turn is being made, the process advances to step S2102, and a determination is made as to whether the steering operation performed by the driver is additional steering in the right direction. When an additional steering operation is being carried out in the right direction, the process then advances to S2103 and a determination is made as to whether the torque command value T_ST calculated in step S200 is a positive value.

In step S2103, when the torque command value T_ST>0, the process advances to step S2104, and the torque command value T_ST is outputted to the steering reaction force generator 80. However, when the torque command value T_ST is equal to zero or a negative value, the process advances to step S2108

A steering reaction force can thereby be added in the direction that returns the steering wheel 81 to the left when the driver has performed an additional steering operation in the right direction as the host vehicle is making a right turn. When the road resulting from the right turn is a road on which travel is not permitted or a rearward vehicle is approaching from the adjacent lane to the right, steering reaction force is increased in a discontinuous manner in the direction that returns the steering wheel 81 to the left.

When a negative determination is made in step S2101, the process advances to step S2105, and a determination is made as to whether the steering operation performed by the driver is additional steering in the left direction. When an additional steering operation is being carried out in the left direction as the host vehicle is turning left, the process then advances to S2106.

In step S2106, a determination is made as to whether the torque command value T_ST is a negative value. When the torque command value T_ST<0, the process advances to step S2107 and the torque command value T_ST is outputted to the steering reaction force generator 80.

A steering reaction force can thereby be added in the direction that returns the steering wheel 81 to the right when the driver has performed an additional steering operation in the left direction as the host vehicle is making a left turn. When the road resulting from the left turn is a road on which travel is not permitted or a rearward vehicle is approaching from the adjacent lane to the left, steering reaction force is increased in a discontinuous manner in the direction that returns the steering wheel 81 to the right.

When a negative determination is made in steps S2102, S2103, S2105, or S2106, the process advances to step S2108, and the torque command value T_ST is corrected to zero and outputted. A steering reaction force that corresponds to the risk potentials R1_Y and R2_Y in the left/right direction is thereby not generated when, for example, the host vehicle is traveling straight forward, when additional operation has not been performed, or in other cases. The current process is thereby ended.

The effect of the first embodiment is described below with reference to diagrams (a) to (d) of FIG. 13. In this description, the operation performed when the operation reaction force generated in the accelerator pedal 71 is controlled based on the risk potentials R1_X and R2_X in the forward/rearward direction is described as an example. The risk potential R21_X in the forward/rearward direction of the host vehicle risk factors attributed to the travel rule is selected as the risk potential R2_X in the forward/rearward direction used for discontinuous reaction force output.

Figure 13:
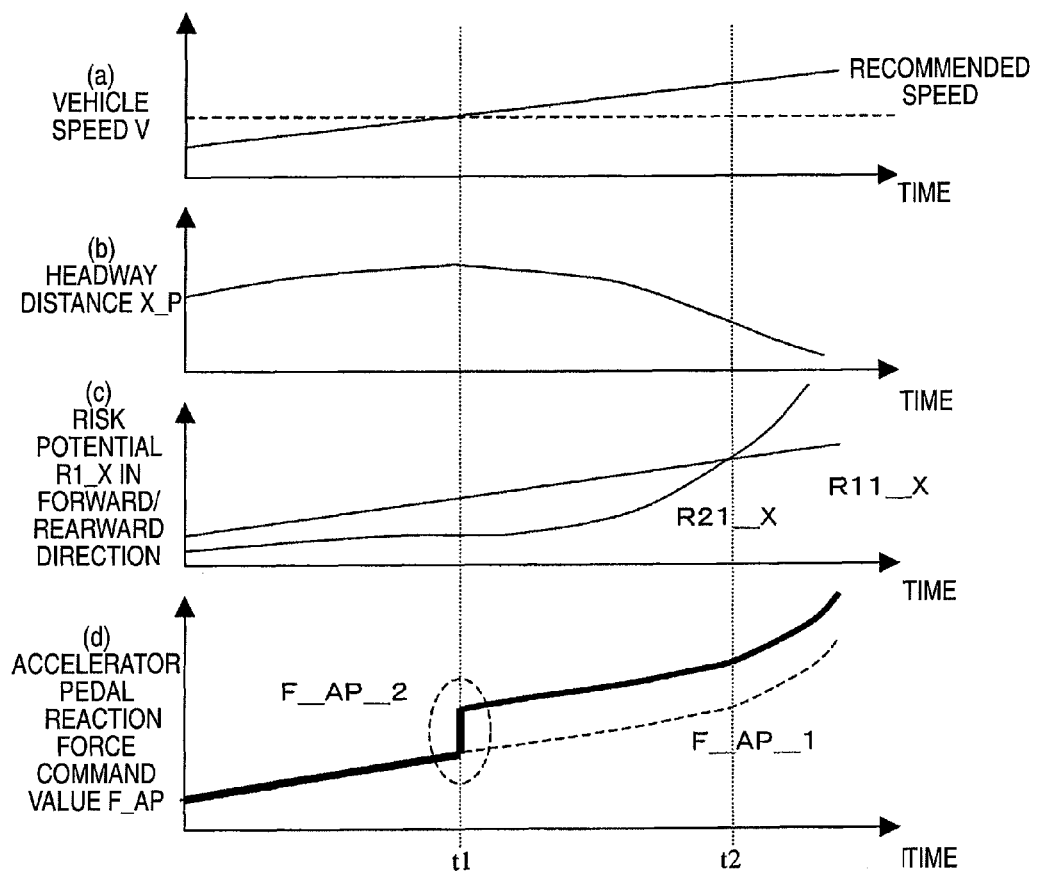
FIG. 13 is a series of diagrams showing examples of changes that occur over time in the host vehicle speed, the headway distance, the risk potential in the forward/rearward direction for outputting a continuous reaction force, and the accelerator pedal reaction force command value, respectively, for the case in which the host vehicle has exceeded a recommended speed.

Diagrams (a) to (d) of FIG. 13 show changes that occur over time in the host vehicle speed V, the headway distance X_P to the preceding vehicle, the risk potential R1_X in the forward/rearward direction, and the accelerator pedal reaction force command value F_AP. When the accelerator pedal 71 is depressed in a substantially constant manner and the host vehicle speed V gradually increases, the risk potential R11_X in the forward/rearward direction attributed to the kinetic energy of the host vehicle gradually increases, as shown in diagram (c) in FIG. 13.

When the risk potential R11_X is greater than the continuous risk potential R21_X in the forward/rearward direction based on the proximity to the preceding vehicle, the accelerator pedal reaction force command value F_AP gradually increases as the R11_X increases. The accelerator pedal reaction force command value F_AP in this case is equal to the reaction force control variable F_AP_1 that corresponds to the risk potential R11_X in the forward/rearward direction.

When the host vehicle speed V exceeds a recommended speed at time t1, a reaction force command value F_AP is generated. This value is obtained by a method in which the reaction force control variable F_AP_2 that corresponds to the risk potential R2_X in the forward/rearward direction attributed to the travel rule of the host vehicle is added to the reaction force control variable F_AP_1 that corresponds to the risk potential R1_X in the forward/rearward direction. The accelerator pedal operation reaction force is thereby increased in a discontinuous manner, and the driver can clearly be made aware from the instantaneous increase in the operation reaction force that the risk attributed to the travel rule has increased. Specifically, the driver can clearly be made aware from the instantaneous increase in the operation reaction force that the host vehicle speed V1 has exceeded the recommended speed.

When the risk potential R21_X in the forward/rearward direction based on the proximity to the preceding vehicle at time t2 thereafter becomes greater than the risk potential R11_X in the forward/rearward direction attributed to kinetic energy, the accelerator pedal reaction force command value F_AP increases in accordance with the increase in the R21_X, and the driver is notified by a continuous increase in the operation reaction force that the host vehicle is approaching a preceding vehicle.

Figure 14:
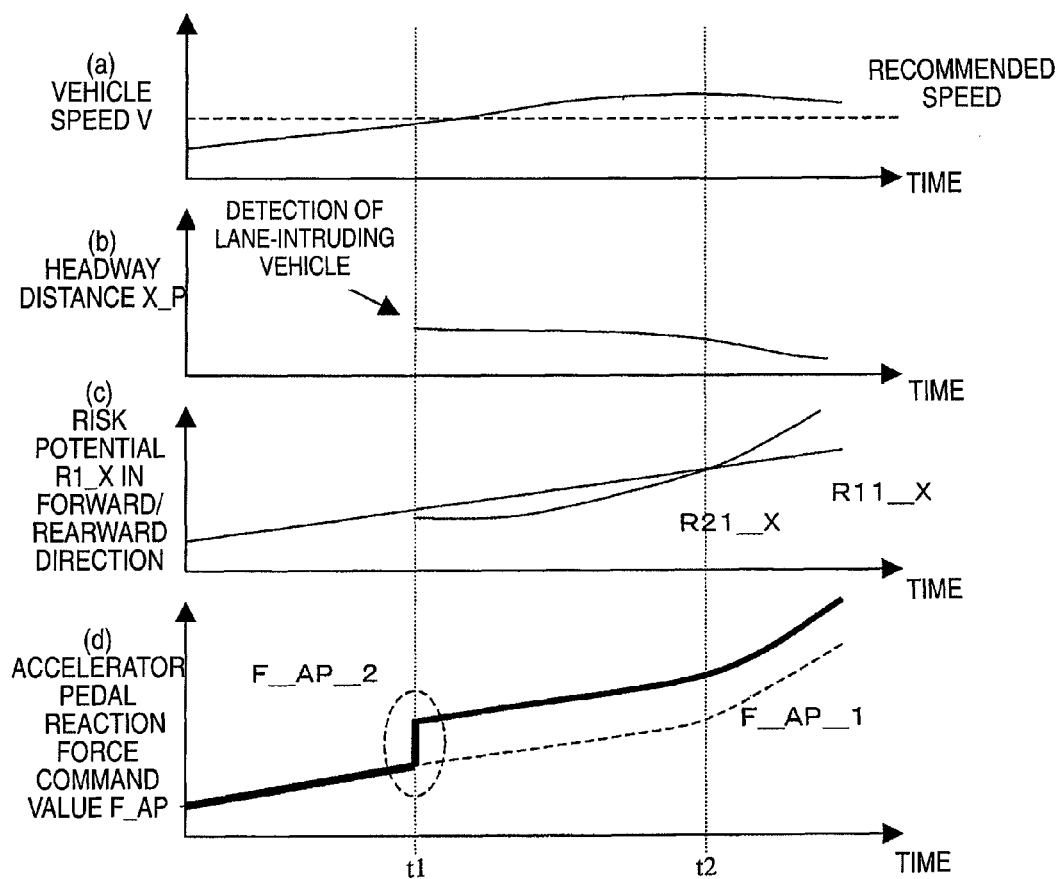
FIG. 14 is a series of diagrams showing examples of changes that occur over time in the host vehicle speed, the headway distance, the risk potential in the forward/rearward direction for outputting a continuous reaction force, and the accelerator pedal reaction force command value, respectively, for the case in which an lane-intruding vehicle is detected.

Described next with reference to diagrams (a) to (d) of FIG. 14 is the effect of a case in which the event-related risk potential R22_X in the forward/rearward direction of the peripheral risk factors is selected as the risk potential R2_X in the forward/rearward direction used for discontinuous reaction force output.

The accelerator pedal reaction force command value F_AP increases in accordance with the risk potential R11_X in the forward/rearward direction of the host peripheral risk factors attributed to kinetic energy until time t1 at which the preceding vehicle has not been detected. When an intruding vehicle is detected ahead of the host vehicle at time t1, a reaction force control variable F_AP_2 based on the risk potential R22_X in the forward/rearward direction for the intruding vehicle is added to the reaction force control variable F_AP_1 that corresponds to the risk potential R1_X in the forward/rearward direction. The accelerator pedal operation reaction force is thereby increased in a discontinuous fashion, and the driver can be notified, based on the sudden increase in the operation reaction force, of a risk that did not exist at an earlier time, i.e., the fact that another vehicle has intruded into the lane.

Thus, the first embodiment described above has the following effects.

First, the vehicle driving assist system 1 detects risk factors related to the host vehicle and peripheral risk factors in an area around the host vehicle, and calculates risk potentials R11 and R12 of host vehicle risk factors attributed to factors related to the host vehicle, as well as risk potentials R21 and R22 due to the peripheral risk factors attributed to factors in an area around the host vehicle. The risk potentials R11, R12, R21, and R22 are selectively indicated to the driver with the aid of a single risk notification device. A plurality of risk factors is present in the host vehicle and the area around the host vehicle, and a plurality of risk potentials R11, R12, R21, and R22 attributed to the plurality of risk factors is selectively indicated with the aid of a single device, and is thereby separately indicated to the driver in a manner that is easy to perceive.

Second, the vehicle driving assist system 1 detects host vehicle risk factors related to either the host vehicle speed V or the lateral acceleration ay and a travel rule of the host vehicle. The risk potential R11 attributed to kinetic energy is calculated on the basis of either the host vehicle speed V or the lateral acceleration ay. The risk potential R12 attributed to the travel rule is calculated. Also calculated are the risk potential R1 attributed to the kinetic energy (first host vehicle risk potential) and the risk potential R12 attributed to the travel rule (second host vehicle risk potential). The risk potential R11 is indicated to the driver via a continuous operation reaction force generated in a driver-operated driving operation device, while the risk potential R12 is indicated to the driver via a discontinuous operation reaction force generated in a driver-operated driving operation device. The driver-operated driving operation device used a risk notification device which the driver uses to drive and operate the host vehicle. In the illustrated embodiment, the accelerator pedal 71 and the steering wheel 81 are driver-operated driving operation devices that are used as the risk notification device. When the risk potential R11 attributed to kinetic energy increases, damage will increase in a case in which an unforeseen situation occurs. Therefore, the driver can be effectively notified of the risk potential by the transmission of a continuous operation reaction force. The risk potential R12 attributed to the travel rule is indicated using an operation reaction force that varies in a discontinuous manner, whereby the driver can clearly be made aware of a risk that is different than the risk potential R11 attributed to kinetic energy.

Third, the vehicle driving assist system 1 detects as peripheral risk factors a plurality of obstacles present in an area around the host vehicle, calculates the risk potential R21 that remains relatively constant in accordance with the proximity to the obstacles (first risk potential of the peripheral risk factors), and calculates the risk potential R22 that suddenly changes due to the appearance of obstacles (second risk potential of the peripheral risk factors). The risk potential R21 is indicated to the driver via a continuous operation reaction force generated in a driver-operated driving operation device, and the risk potential R22 is indicated to the driver via a discontinuous operation reaction force generated in a driver-operated driving operation device. The driver can be continuously made aware of the proximity to obstacles by continuously transmitting the risk potential R21 by way of a continuous operation reaction force. The driver is made aware of the appearance of obstacles with the aid of a discontinuous operation reaction force, whereby the driver can be reliably notified of the fact that a different risk is occurring.

Fourth, the controller 60 selects the greater of the risk potentials R11 and R12 and generates a continuous operation reaction force, and selects the risk potential R22 with higher priority from among the risk potentials R12 and R22 and generates a discontinuous operation reaction force. Risk factors that need to be indicated to the driver with greater urgency can be indicated with a higher priority, and risk potentials can therefore be indicated with good efficiency.

Fifth, the controller 60 generates a discontinuous operation reaction force that is added to a continuous operation reaction force. When either the risk potential R21 or R22 is generated while being continuously indicated, the information can be incrementally indicated to the driver.

Sixth, the travel rule acquisition section 20 detects, as a part of a travel rule, whether the speed of the host vehicle is the recommended upper limit speed, and/or whether the roads to the left and right are roads on which travel is not permitted. When the host vehicle speed V has exceeded the recommended speed, or when the road to the right or left is a road on which travel is not permitted, the information can be reliably indicated to the driver via a discontinuous operation reaction force.

When the risk potential R1_Y in the left/right direction attributed to the kinetic energy of the host vehicle is calculated, the lateral acceleration estimated based on the yaw rate θ, or the lateral acceleration estimated based on the yaw rate θ and the host vehicle speed V1 can be used in place of the lateral acceleration ay detected by a lateral acceleration sensor.

The reaction force control variable F_AP_2 can be calculated so that a pulsed incremental reaction force is generated on the basis of the risk potential R2_X in the forward/rearward direction. Specifically, in a prescribed interval of time that elapses from the moment when the risk potential R2_X in the forward/rearward direction changes from 0 to 1, the reaction force control variable F_AP_2 is set to F1. When the risk potential R2_X is equal to zero or when a prescribed length of time or longer elapses after R2_X has been set to 1, the reaction force control variable F_AP_2 is set to zero. The prescribed value F1 and the prescribed time are set to values that allow the driver to be clearly made aware of pulsed changes in the reaction force by incrementally adding F1 to the operation reaction force. In view of the above, the prescribed time is set to 0.5 seconds, for example. The accelerator pedal reaction force command value F_AP is calculated in accordance with Equation 7 described above.

Figure 15:
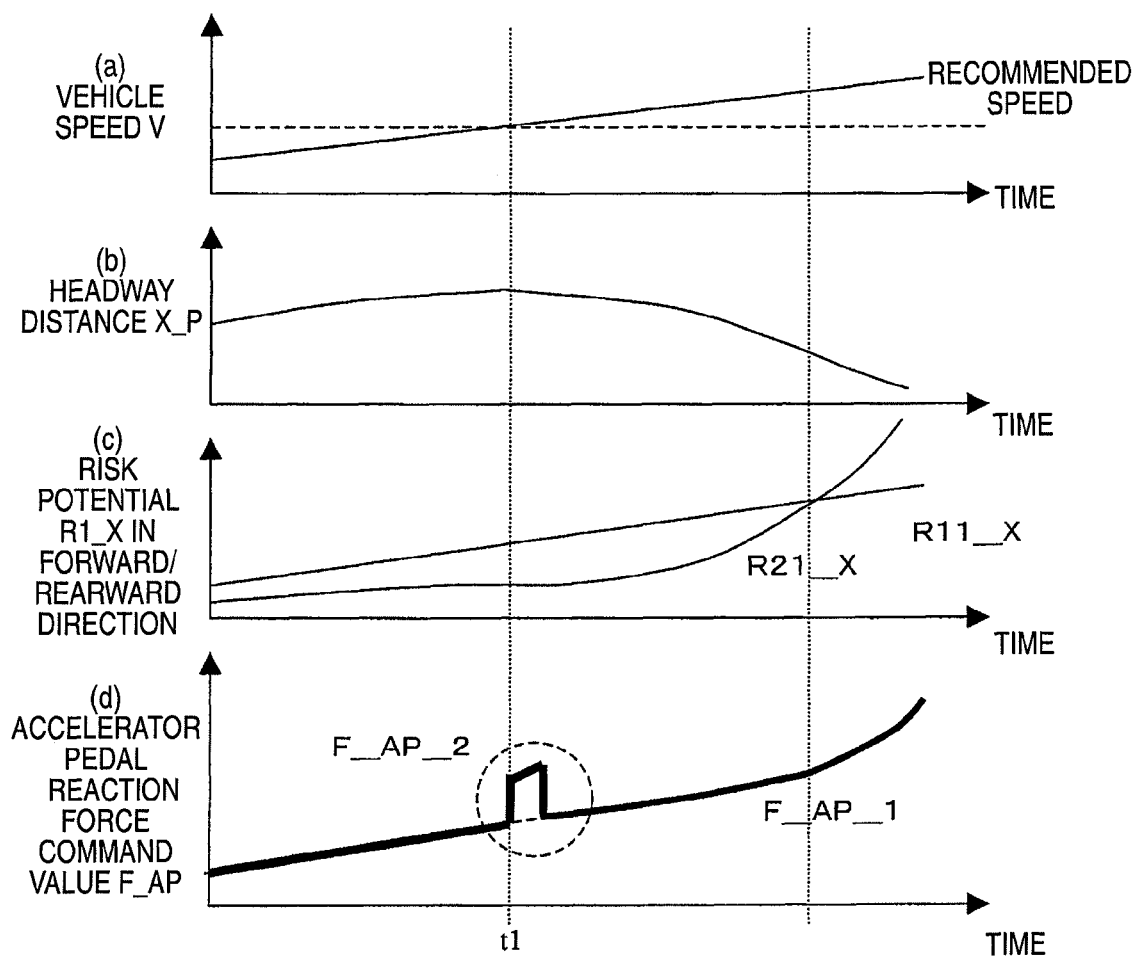
FIG. 15 is a series of diagrams showing examples of changes that occur over time in the host vehicle speed, the headway distance, the risk potential in the forward/rearward direction for outputting a continuous reaction force, and the accelerator pedal reaction force command value, respectively, in modified example 1 of the first embodiment.

The effects of this case are described below with reference to diagrams (a) to (d) of FIG. 15. Diagrams (a) to (d) of FIG. 15 show the change over time of the host vehicle speed V, the headway distance X_P to the preceding vehicle, the risk potential R1_X in the forward/rearward direction used for continuous reaction force output, and the accelerator pedal reaction force command value F_AP.

When the host vehicle speed V exceeds a recommended speed at time t1, a reaction force control variable F_AP_2 that corresponds to the risk potential R2_X in the forward/rearward direction attributed to the travel rule of the host vehicle is added for a prescribed period of time to the reaction force control variable F_AP_1 that corresponds to the risk potential R1_X in the forward/rearward direction. The accelerator pedal operation reaction force is thereby increased in a discontinuous manner, and the driver can clearly be made aware from the instantaneous increase in the operation reaction force that a risk has arisen that is different than what has occurred until this point, i.e., that the host vehicle speed V has exceeded the recommended speed.

After a prescribed period of time, the discontinuously increased operation reaction force is restored to the reaction force control variable F_AP_1 that corresponds to the risk potential R1_X in the forward/rearward direction. In other words, a pulsed incremental reaction force is added to the operation reaction force for only a prescribed length of time. Situations are thereby prevented in which the operation reaction force continues to be heavier and the driver is made to feel discomfort in the accelerator pedal operation.

The time to headway THW and time to collision TTC to obstacles ahead may be separately used when a continuous risk potential R21_X in the forward/rearward direction of peripheral risk factors is calculated.

Figure 16:
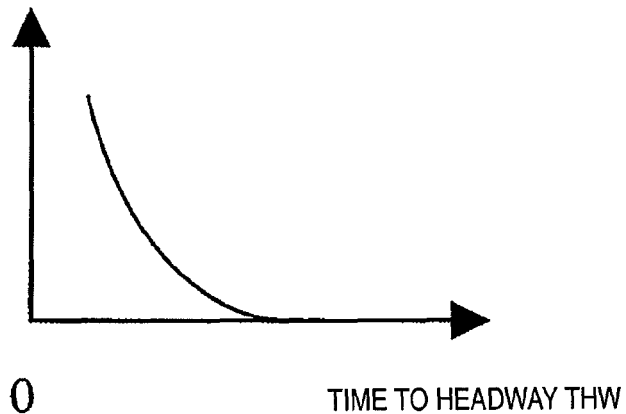
FIG. 16 is a diagram showing the relationship between risk potential and time to headway in modified example 2 of the first embodiment.
Figure 17:
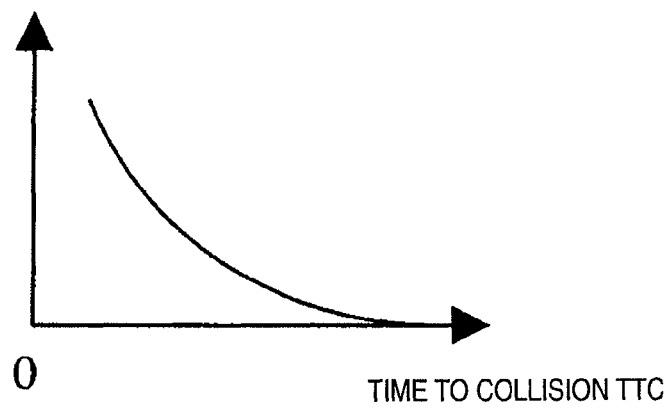
FIG. 17 is a diagram showing the relationship between risk potential and time to collision in modified example 2 of the first embodiment.
Figure 18:
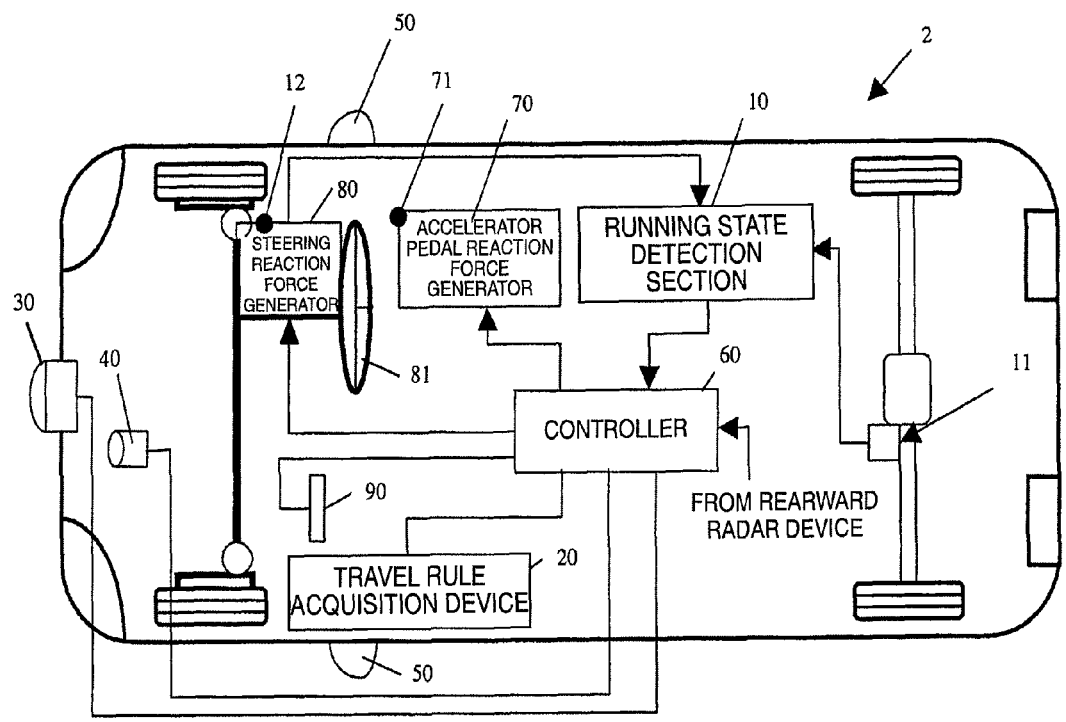
FIG. 18 is a simplified diagrammatic view of a vehicle in which the vehicle driving assist system is installed in accordance with a second embodiment of the present invention.

Specifically, the risk potential R21_thw that corresponds to the time to headway THW is calculated in accordance with the map shown in FIG. 16. The risk potential R21_ttc that corresponds to the time to collision TTC is calculated in accordance with the map shown in FIG. 17. The greater value of R21_thw and R21_ttc is set as the risk potential R21_X in the forward/rearward direction.

Second Embodiment

Referring now to FIGS. 18 to 22, a vehicle driving assist system 2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Thus, the points that differ from the first embodiment are mainly described below.

Figure 19:
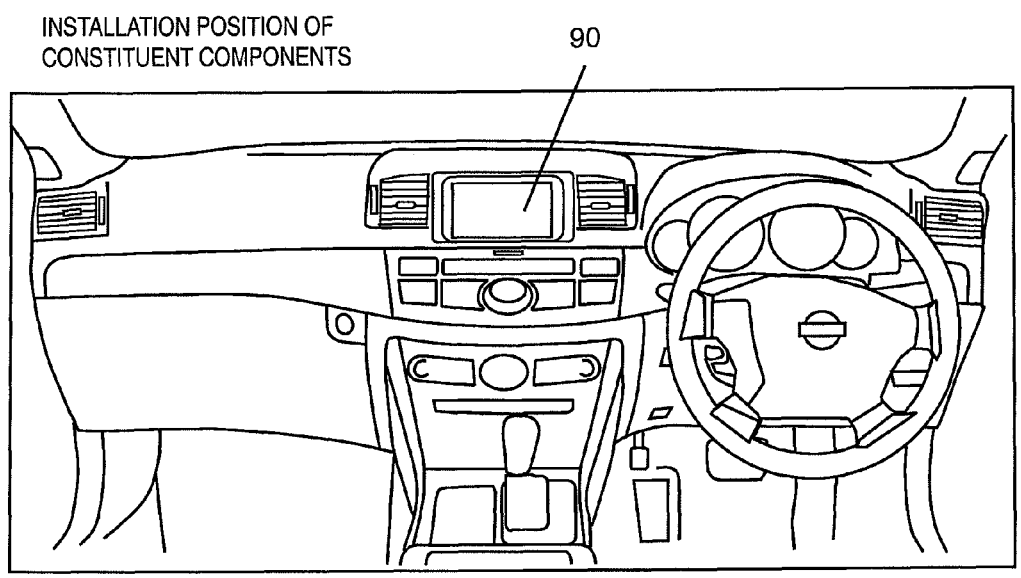
FIG. 19 is a simplified diagram showing an example of arrangement of a display device.

The vehicle driving assist system 2 in the second embodiment is further provided with a display device 90 for displaying information related to the risk potential R12 of host peripheral risk factors attributed to the travel rule. The display device 90 is provided with a liquid crystal monitor installed, e.g., in the instrument panel of a vehicle, as shown in FIG. 19, and is capable of displaying text and illustrations. The monitor of a navigation system can be used, for example.

Figure 20:
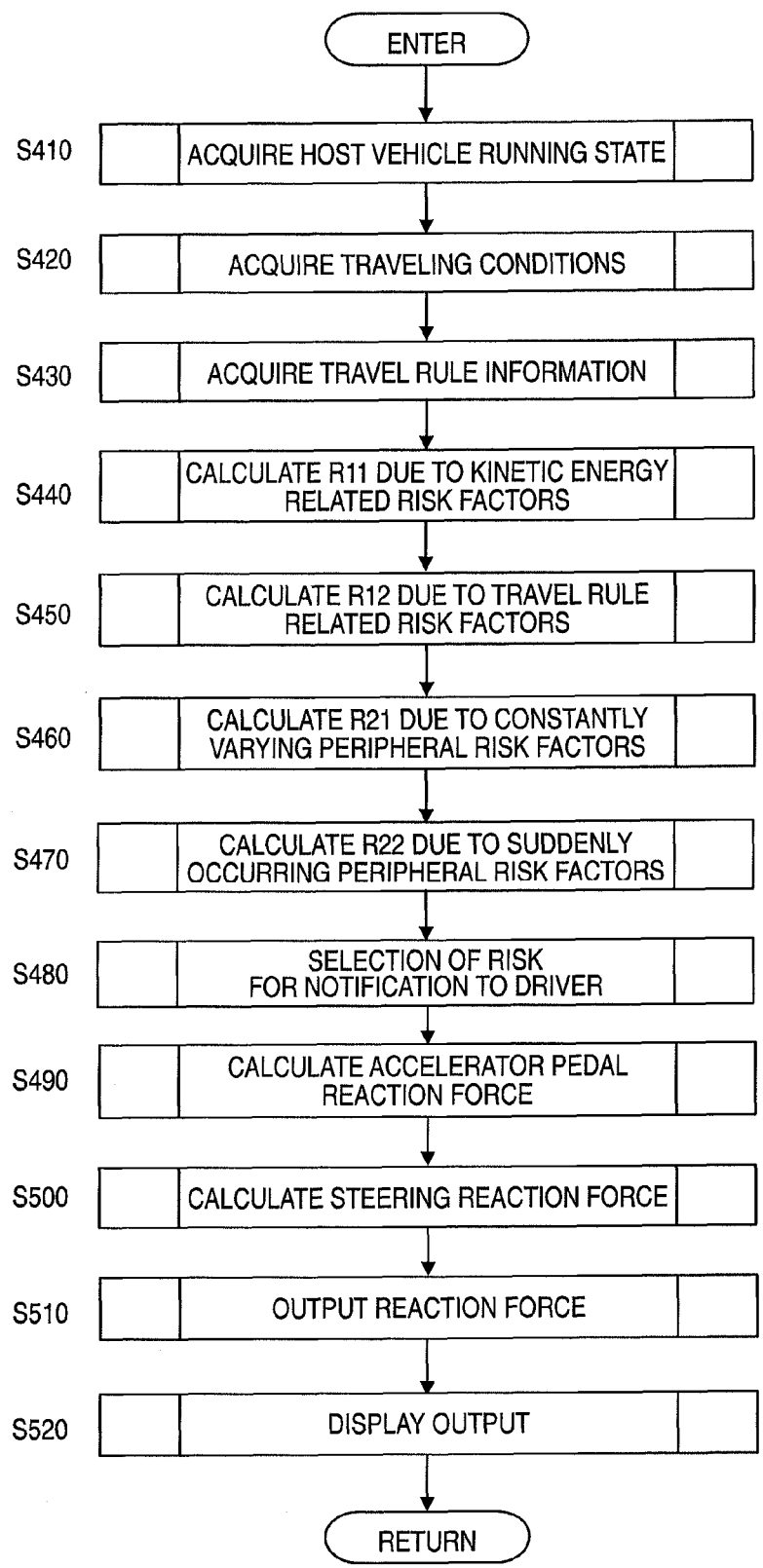
FIG. 20 is a flowchart showing a processing sequence for a vehicle drive operation assist control program according to the second embodiment.

The operation of the vehicle driving assist system 2 according to the second embodiment is described in detail below with reference to FIG. 20. FIG. 20 is a flowchart showing a processing sequence for a vehicle drive operation assist control program executed by the controller 60. The processing steps are carried out in a continuous fashion at fixed intervals (50 msec, for example). The processing in steps S410 to S510 is the same as the processing in steps S110 to S210 of the flowchart shown in FIG. 3, and a description will therefore be omitted.

In step S520, output processing is executed for displaying the risk potential R12 of host vehicle risk factors attributed to the travel rule. Specifically, when an event-related risk potential R22_X in the forward/rearward direction of peripheral risk factors has been output with higher priority as the risk potential R2_X in the forward/rearward direction, and/or when an event-related risk potential R22_Y in the left/right direction has been output with higher priority as the risk potential R2_Y in the left/right direction, information related to the risk potential R12_X in the forward/rearward direction attributed to the travel rule of host vehicle risk factors and/or the risk potential R12_Y in the left/right direction is displayed on the display device 90.

The display output processing will be described for a case in which a determination is made as to whether the host vehicle speed V has exceeded the recommended speed as the risk potential R12_X in the forward/rearward direction of the host vehicle risk factor attributed to the travel rule, and a road on which travel is not permitted is present in the right or left direction is detected as the risk potential R12_Y in the left/right direction of the host vehicle risk factor attributed to the travel rule.

Figure 21:
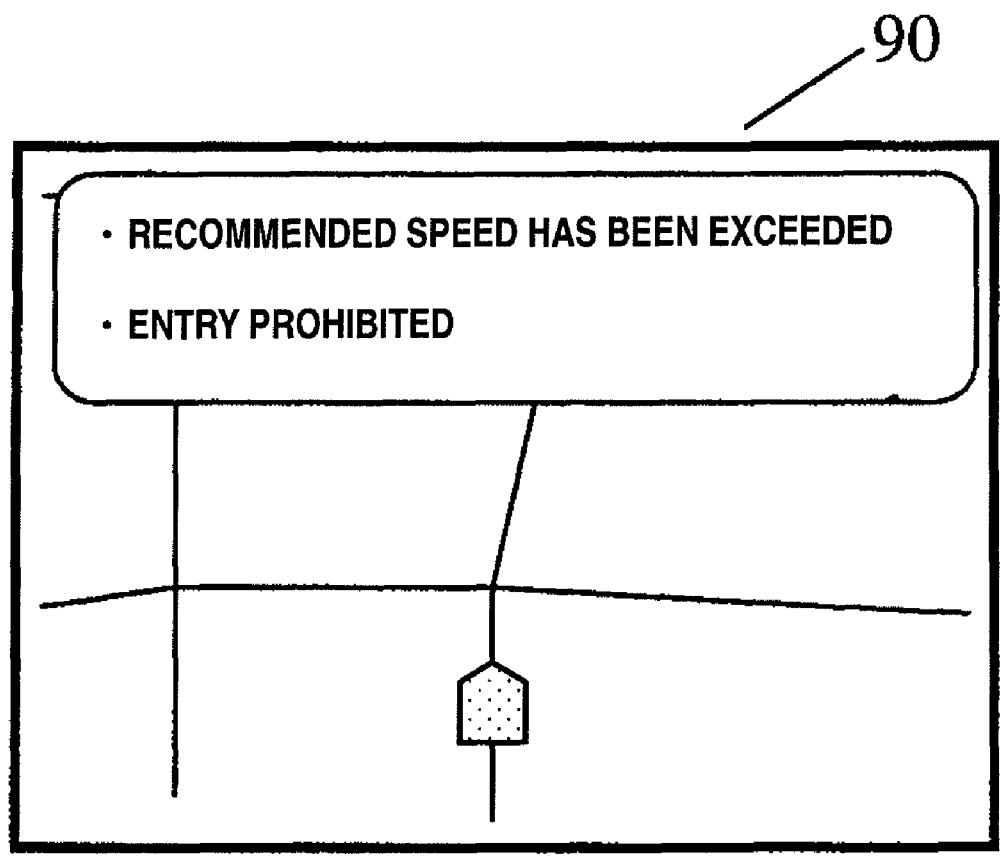
FIG. 21 is a diagram showing an example of displaying information related to the risk potential attributed to the travel rule.

A text message stating "the recommended speed has been exceeded" is displayed on the display device 90, as shown in FIG. 21, when the risk potential R12_X in the forward/rearward direction of a host vehicle risk factor is equal to 1 and an event-related risk potential R22_X in the forward/rearward direction of a peripheral risk factor is selected as the risk potential R2_X in the forward/rearward direction. A text message stating "entry is prohibited" is displayed when the risk potential R12_Y in the left/right direction of the host vehicle risk factor is equal to 1 and a risk potential R22_Y in the left/right direction of the peripheral risk factor is selected as R2_Y. FIG. 21 shows a display example of a pop-up text message on the route guide display of a navigation system.

Thus, the second embodiment described above has the following effects in addition to the effects of the first embodiment described above.

The vehicle driving assist system 2 displays information related to the risk potential R12 of host vehicle risk factors on the display device 90 when a discontinuous operation reaction force is generated in accordance with the risk potential R22 of peripheral risk factors. Specifically, a text message is displayed that states that the recommended speed has been exceeded and/or the road to the right or left is a road on which travel is not permitted, as shown in FIG. 21. When the risk potential R12 and R22 are occurring, one of the two can be indicated as tactile information by way of a discontinuous operation reaction force, and the other risk potential can be indicated to the driver as visual information.

Third Embodiment

A vehicle driving assist system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Thus, the points that differ from the first embodiment are mainly described below.

In the third embodiment, the recommended speed as a risk potential R12 of host vehicle risk factors attributed to the travel rule is determined and lane-intruding vehicle information is used as the event-related risk potential R22 of the peripheral risk factors. In this case, the two different risk potentials R12 and R22 are indicated to the driver. In this situation, only the risk potentials R12_X and R22_X will be described.

The process for selecting a risk potential will be described first. This processing is carried out in step S180 of the flowchart shown in FIG. 3. When only the risk potentials R12_X and R22_X in the forward/rearward direction are used, the acquisition of information related to risk factors in the left/right direction is not required in steps S110 to S130.

The greater risk potential in terms of a value is selected with the aid of Equation 9 noted below as the risk potential R1_X that is used for continuous reaction force output. The selection is made from among the risk potential R11_X attributed to the kinetic energy of host vehicle risk factors, and the continuous risk potential R21_X of the peripheral risk factors.

$$R1\_X = \max\{R11\_X, R21\_X\} \quad (9)$$

In Equation 9, the term "max" is a function for selecting the greater of two values.

The risk potential R12_X in the forward/rearward direction attributed to the travel rule of the host vehicle risk factors, and the event-related risk potential R22_X in the forward/rearward direction of peripheral risk factors are both used in the processing.

The command value F_AP of the operation reaction force to be added to the accelerator pedal 71 is calculated. This processing is carried out in step S190 of FIG. 3. The reaction force control variable F_AP_1 is calculated in accordance with the risk potential R1_X in accordance with the map of FIG. 9 in the same manner as in the first embodiment described above. The reaction force control variables F_AP_12 and F_AP_22 are calculated based on the risk potentials R12_X and R22_X.

When the risk potential R12_X of host vehicle risk factors attributed to the travel rule is equal to zero, the reaction force control variable F_AP_12 is set to zero. In the event that R12_X=1, F_AP_12 is set to F2 if the accelerator pedal 71 has been further depressed, and F_AP_12 is set to zero if the accelerator pedal 71 has not been further depressed. The prescribed value F2 is set as a reaction force value that is greater than the reaction force generated by an ordinary additional depression of the accelerator pedal, making it difficult to depress the accelerator pedal 71. The prescribed value F2 can be set as a value that is proportional to the depression velocity of the accelerator pedal 71. The operation of depressing the accelerator pedal 71 can be determined to be additional depression when the accelerator-pedal depression value detected by, e.g., an accelerator stroke sensor (not shown) has increased above a prescribed value.

The reaction force control variable F_AP_22 is set to F1 in the interval of time that begins when the risk potential R22_X of the event-related peripheral risk factor has changed from 0 to 1 and ends when a prescribed length of time has elapsed. The reaction force control variable F_AP_22 is set to zero when the risk potential R22_X=0, or when the risk potential R22_X has changed to 1 and a prescribed length of time or more has elapsed.

The accelerator pedal reaction force command value F_AP is calculated from Equation 10 below on the basis of the reaction force control variables F_AP_1, F_AP_12, and F_AP_22

$$F\_AP = F\_AP\_1 + F\_AP\_12 + F\_AP\_22 \quad (10)$$

Figure 22:
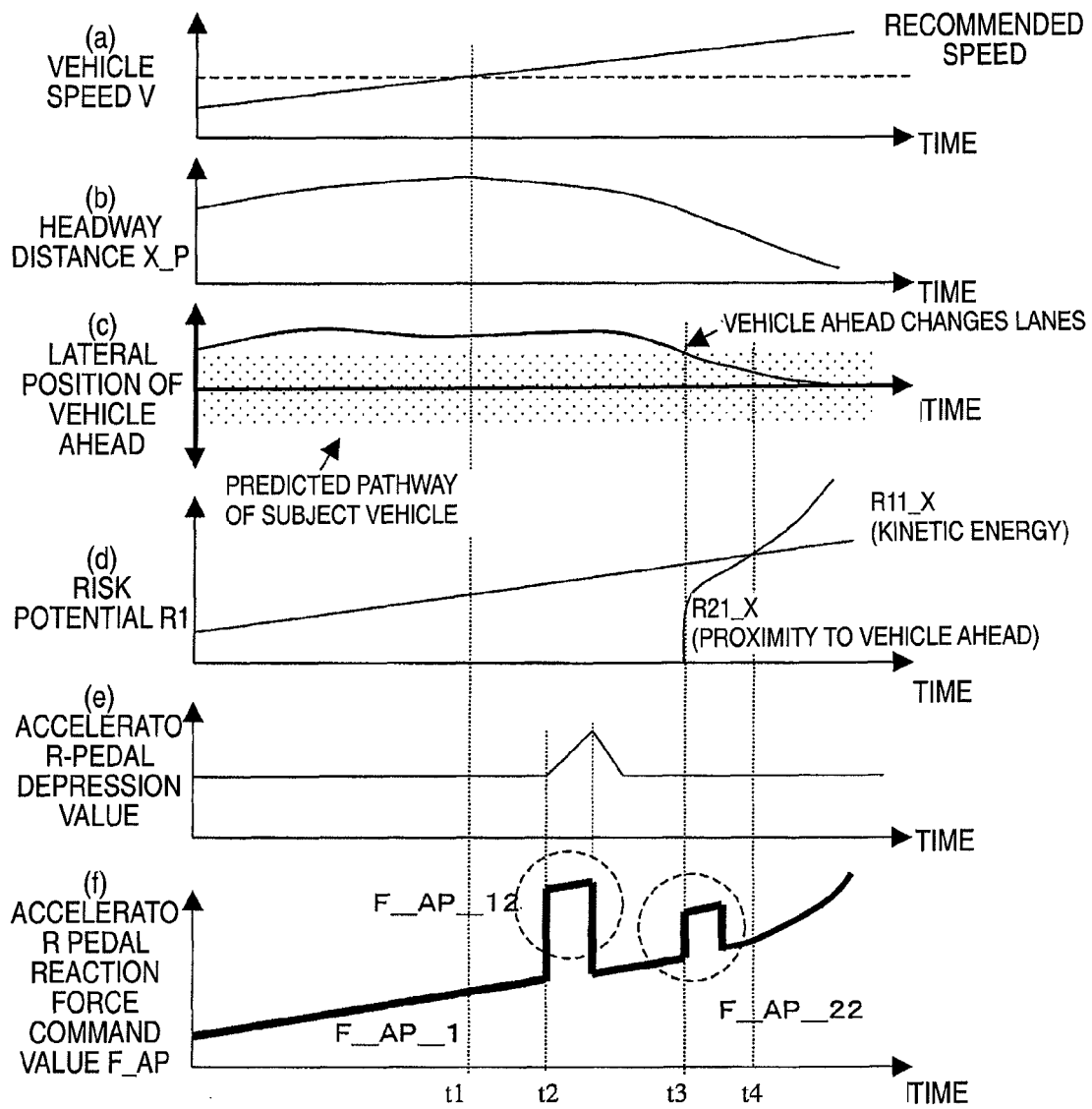
FIG. 22 is a series of diagrams showing examples of changes that occur over time in the host vehicle speed, the headway distance, the lateral position of the vehicle ahead, the risk potential in the forward/rearward direction for outputting a continuous reaction force, the accelerator-pedal depression value, and the accelerator pedal reaction force command value, respectively, in the third embodiment.

The effect of the third embodiment will be described with reference to diagrams (a) to (f) of FIG. 22. Diagrams (a) to (f) of FIG. 22 show the change over time of the host vehicle speed V, the headway distance X_P to a vehicle ahead of the host vehicle, the lateral position of the vehicle ahead, the risk potential R1_X in the forward/rearward direction used for continuous reaction force output, and the accelerator pedal reaction force command value F_AP. The accelerator pedal reaction force command value F_AP is gradually increased in accordance with the risk potential R11_X in the forward/rearward direction attributed to kinetic energy when the accelerator pedal 71 has been depressed in a substantially constant manner and the host vehicle speed V has gradually increased.

A reaction force control variable F_AP_12 that corresponds to the risk potential R12_X in the forward/rearward direction attributed to the travel rule is not generated in cases in which the accelerator pedal 71 has not been further depressed even when the host vehicle speed V has exceeded the recommended speed at time t1. When the accelerator pedal is detected to have been further depressed at time t2, a reaction force control variable F_AP_12 that considerably exceeds the reaction force value of ordinary additional depression is added to the reaction force control variable F_AP_1 during the interval in which the accelerator pedal 71 is being further depressed.

A pulsed reaction force control variable F_AP_22 that corresponds to the risk potential R22_X in the forward/rearward direction due to a lane-intruding vehicle is thereafter added for a prescribed length of time when another vehicle traveling ahead in an adjacent lane changes lanes into the predicted pathway of the host vehicle at time t3. The reaction force control variable F_AP_1 that corresponds to R21_X is generated when the risk potential R21_X resulting from the proximity to the lane-intruding vehicle exceeds R11_X at time t4.

Thus, the third embodiment described above has the following effects in addition to the effects of the first and second embodiments described above.

The controller 60 varies the pulsed operation reaction force in accordance with the risk potential R22, and when the driver-operated driving operation device is further operated, the operation reaction force is increased in accordance with the risk potential R12. Specifically, when the host vehicle speed V has exceeded a recommended speed, a considerable incremental reactive force is generated against the accelerator pedal depression operation of the driver, and when the other vehicle that was present ahead of the host vehicle has made a lane change into the lane of the host vehicle, a pulsed reaction force is added for a short time only. Thus, different risk potentials R12_X and R22_X generated by different risk factors can be clearly distinguished by changing the mode, the magnitude, and the addition time of the added reaction force.

Fourth Embodiment

A vehicle driving assist system will now be explained in accordance with a fourth embodiment. The basic configuration of the vehicle driving assist system 4 according to the fourth embodiment is the same as in the first embodiment shown in FIG. 1. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. Thus, the points that differ from the first embodiment are mainly described below.

In the fourth embodiment, the output of the discontinuous added reaction force is stopped when the driver further depresses the accelerator pedal 71 in a state in which an added reaction force is added that varies in a discontinuous manner in accordance with the risk potential R2_X in the forward/rearward direction. Specifically, the transmission control of the risk potential R2_X in the forward/rearward direction is overridden when the driver depresses the accelerator pedal. The operation in which the driver depresses the accelerator pedal 71 so that the transmission control of the risk potential R2_X is stopped is referred to as an override operation.

Figure 23:
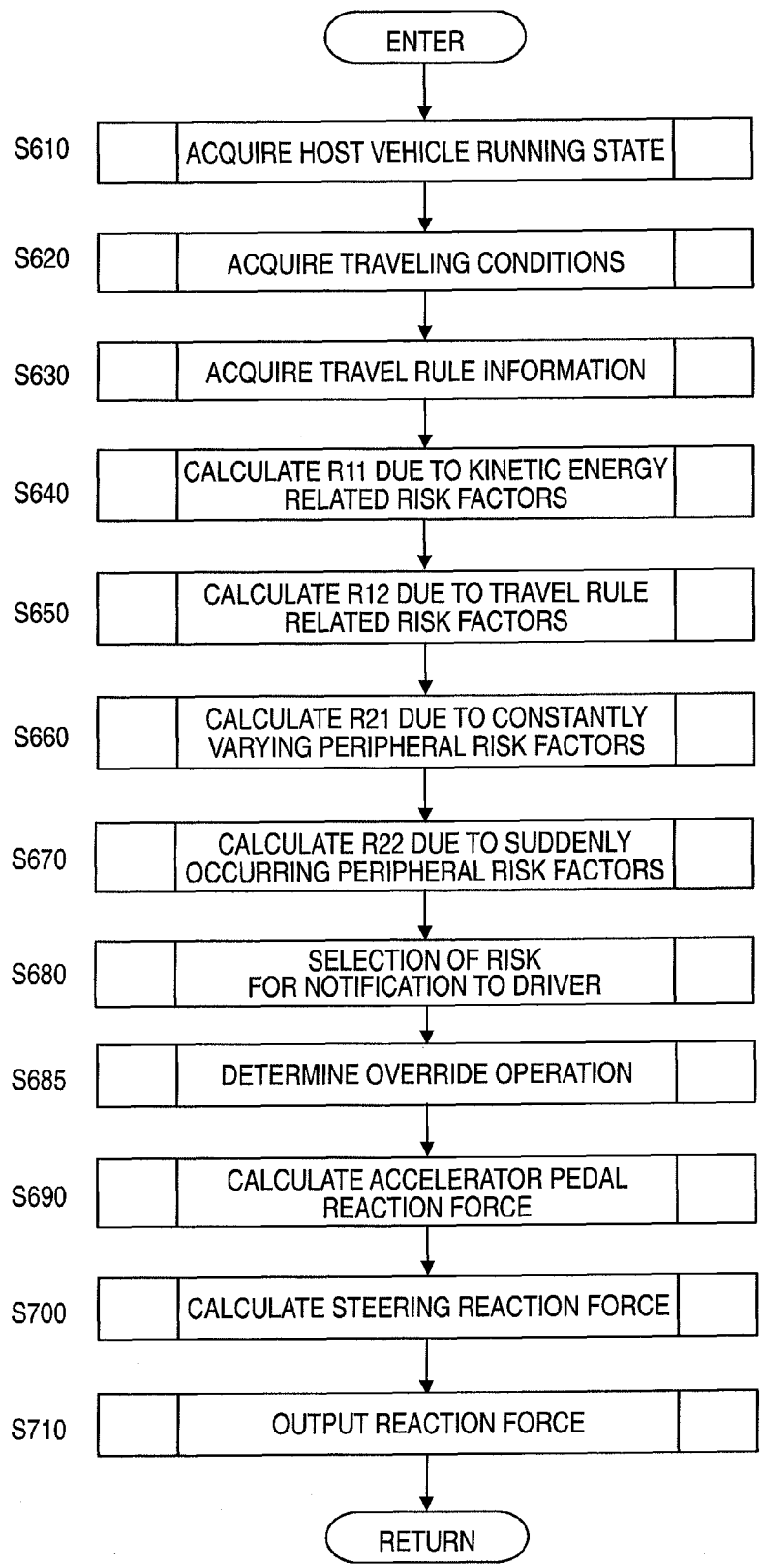
FIG. 23 is a flowchart showing a processing sequence for a vehicle drive operation assist control program according to the fourth embodiment.

The operation of the vehicle driving assist system according to the fourth embodiment is described in detail below with reference to FIG. 23. FIG. 23 is a flowchart showing a processing sequence for a vehicle drive operation assist control program executed by the controller 60. The processing steps are carried out in a continuous fashion at fixed intervals (50 msec, for example). The processing in steps S610 to S680 is the same as the processing in steps S110 to S180 of the flowchart shown in FIG. 3, and a description will therefore be omitted.

Figure 24:
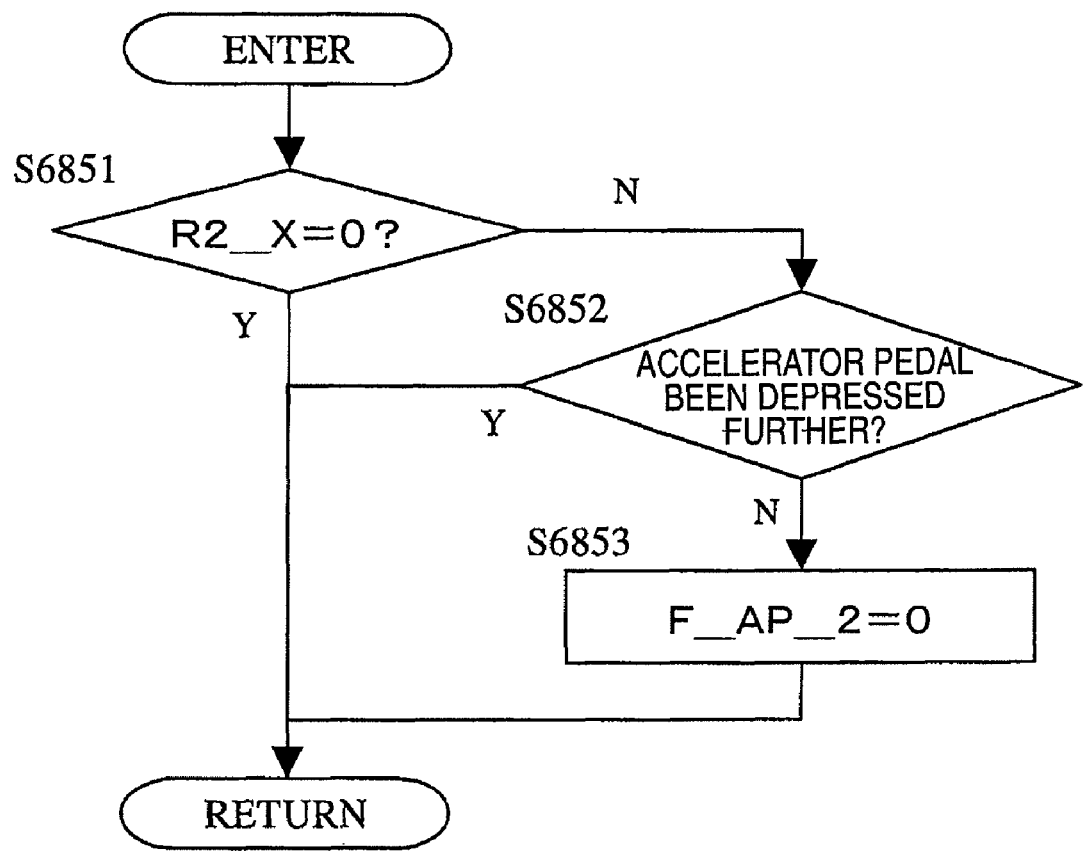
FIG. 24 is a flowchart showing the processing sequence for an override operation determination procedure related to the accelerator pedal operation.

In step S685, it is determined that the driver has carried out an override operation. The processing in this case will be described in accordance with the flowchart of FIG. 24. In step S6851, a determination is made as to whether the risk potential R2_X in the forward/rearward direction is equal to zero. When the risk potential R2_X is equal to zero, the processing is ended. When the risk potential R2_X=1, the process advances to step S6852 and a determination is made as to whether the accelerator pedal 71 has been further depressed. For example, when the accelerator pedal stroke sensor (not shown) detects that the accelerator-pedal depression value has increased above a prescribed value, it is determined that the accelerator pedal 71 has been further depressed.

When the accelerator pedal 71 has been further depressed, the process advances to step S6853 and it is determined that the accelerator pedal operation reaction force that corresponds to the risk potential R2_X in the forward/rearward direction has been stopped. Specifically, the reaction force control variable F_AP_2 is set to zero when the reaction force control variable F_AP_2 based on the risk potential R2_X in the forward/rearward direction is calculated in step S690. When it is determined in step S6852 that there is no further depression, it is determined that there is no override operation and the processing is ended.

In step S690, the accelerator pedal reaction force command value F_AP is calculated based on the risk potentials R1_X in the forward/rearward direction. When it has been determined based on the override operation determination result of step S685 that an override operation has been carried out, the reaction force control variable F_AP_2 based on the risk potential R2_X is not calculated (F_AP_2=0).

In step S700, the torque command value T_ST is calculated based on the risk potentials R1_Y and R2_Y in the left/right direction. In step S710, the accelerator pedal reaction force command value F_AP calculated in step S690 is outputted to the accelerator pedal reaction force generator 70, and the torque command value T_ST calculated in step S700 is outputted to the steering reaction force generator 80, thereby ending the current processing.

Thus, the fourth embodiment described above has the following effects in addition to the effects of the first to third embodiments described above.

The vehicle driving assist system 1 further detects the operating state of a driver-operated driving operation device, and when a discontinuous operation reaction force is being generated, the generation of discontinuous operation reaction force is stopped when a driver-operated driving operation device is further operated. Specifically, the generation of an additional reaction force is stopped in the case that the accelerator pedal 71 has been further depressed when an added reaction force that corresponds to the risk potential R2_X is being generated in the accelerator pedal 71. The driving intentions of the driver can thereby be respected and control can be carried out with less annoyance when the driver has intentionally further depressed the accelerator pedal.

A configuration can be adopted in which the generation of added reaction force can be stopped in the case that the steering wheel 81 is further operated when an added reaction force that corresponds to the risk potential R2_Y is being generated in the steering wheel 81.

In the first to fourth embodiments described above, the risk potentials R11_X and R11_Y attributed to kinetic energy of host peripheral risk factors were calculated based on the host vehicle speed V and the lateral acceleration ay, respectively, but the road surface visibility conditions may also be taken into consideration. In other words, the risk potentials R11_X and R11_Y can be corrected so as to be greater when the road surface is slippery or when visibility is reduced. Also, the risk potential R12_X in the forward/rearward direction attributed to the travel rule of the host vehicle risk factors can be calculated based on the set upper limit speed of a speed limiter in place of the recommended speed. In this case, the speed limiter is a device that notifies the driver that the host vehicle speed will exceed the upper speed limit arbitrarily set by the driver. The risk potential R12_Y in the left/right direction may be calculated based on whether a traffic light ahead of the host vehicle is a red light, whether an intersection requires a complete stop, and whether another situation occurs.

The continuous risk potentials R21_X and R22_Y of peripheral risk factors are calculated based on the proximity to a preceding vehicle and the proximity of the lane boundary, but in lieu of this configuration, it is also possible to use proximity to roadside structures, examples of which include pylons, guardrails, and signposts. The event-related risk potentials R22_X and R22_Y may be calculated based on a pedestrian dashing into the street, proximity to a passing vehicle, and other factors, in place of a lane-intruding vehicle.

In the first to fourth embodiments described above, the risk potential 1 attributed to kinetic energy and the risk potential R12 attributed to the travel rule were calculated as the risk potential R1 of the host vehicle risk factors, and the continuous risk potential R21 and the event-related risk potential R22 were calculated as the risk potential R2 of the peripheral risk factors. However, no limitation is imposed thereby, and, for example, R11 or R12 may be calculated as the risk potential R1 of the host vehicle risk factors, and R21 and R22 may be calculated as the risk potential R2 of the peripheral risk factors. In this case as well, a risk potential to be indicated to the driver is suitably selected and a reaction force is controlled based on the risk potential R1 of the host vehicle risk factors and the risk potential R2 of the peripheral risk factors.

In the first to fourth embodiments described above, the accelerator pedal operation reaction force is controlled based on the risk potentials R1_X and R2_X in the forward/rearward direction, and the steering reaction force is controlled based on the risk potentials R1_Y and R2_Y in the left/right direction. However, no limitation is imposed by this configuration, and the configuration may be a system in which only the accelerator pedal operation reaction force is controlled based on the risk potentials R1_X and R2_X in the forward/rearward direction, or may be a system in which only the steering reaction force is controlled based on the risk potentials R1_Y and R2_Y in the left/right direction.

The relationship between the host vehicle speed V and the risk potential R1_X in the forward/rearward direction, and the relationship between the lateral acceleration ay and the risk potential R1_Y in the left/right direction, are not limited to those shown in FIGS. 5 and 6, and it is possible to use another map designed so that the risk potentials R11_X and R11_Y increase with increased host vehicle speed V or lateral acceleration ay. The relationship between the lateral offset value Y_C of the host vehicle and the risk potential R21_Y in the left/right direction, the relationship between the risk potential R1_X in the forward/rearward direction and the reaction force control variable F_AP_1, and the relationship between the risk potential R1_Y in the left/right direction and the torque control variable T_ST_1 are also not limited to those shown in FIGS. 7, 9, and 10.

In the first to fourth embodiments described above, the vehicle running state detection section 10 and the travel rule acquisition section 20 function as the host vehicle risk factor detection section. Thus, the vehicle running state detection section 10, which includes the vehicle speed sensor 11, the steering angle sensor 12, and the like, as mentioned above, together with the travel rule acquisition section 20 (e.g., navigation system as mentioned above) constitutes means for detecting host vehicle risk factors related to a host vehicle). Also the laser radar device 30, the camera device 40, and the rearward radar devices 50 function as the peripheral risk factor detection section (e.g., means for detecting peripheral risk factors in an area around a host vehicle). Furthermore, the controller 60 functions as each of the host vehicle risk potential calculation section using the risk potential table of FIG. 2 and the flow chart of FIG. 3 (e.g., means for calculating a host vehicle risk potential), the peripheral risk potential calculation section (e.g., means for calculating a peripheral risk potential), the risk potential notification section, and the display control section. Furthermore, the accelerator pedal reaction force generator 70 and the steering reaction force generator 80 function as risk notification devices (e.g., means for notifying a driver of the host vehicle risk potential). The display device 90 functions as a display device. The accelerator pedal 71, the steering wheel 81, and the controller 60 function as the operating state detection section.

Thus, while only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
a host vehicle risk factor detection section configured to detect host vehicle risk factors related to a host vehicle;
a peripheral risk factor detection section configured to detect peripheral risk factors in an area around the host vehicle;
a host vehicle risk potential calculation section configured to calculate a host vehicle risk potential attributed to the host vehicle risk factors that are detected by the host vehicle risk factor detection section;
a peripheral risk potential calculation section configured to calculate a peripheral risk potential attributed to the peripheral risk factors that are detected by the peripheral risk factor detection section; and
a risk potential notification section configured to notifying a driver of the host vehicle risk potential calculated by the host vehicle risk potential calculation section with a host vehicle risk potential notification and the peripheral risk potential calculated by the peripheral risk potential calculation section with a peripheral risk potential notification using a common risk notification device for both the host vehicle risk potential notification and the peripheral risk potential notification.

2. The vehicle driving assist system according to claim 1, wherein
the common risk notification device is a driver-operated driving operation device.

3. The vehicle driving assist system according to claim 2, wherein
the risk potential notification section is further configured to notify the driver of the host vehicle risk potential by selectively generating a continuous operation reaction force in the driver-operated driving operation device as the host vehicle risk potential notification when first host vehicle risk factors are detected, to notify the driver of the host vehicle risk potential by selectively generating a discontinuous operation reaction force in the driver-operated driving operation device as the host vehicle risk potential notification when second host vehicle risk factors are detected, to notify the driver of the peripheral risk potential by generating a continuous operation reaction force in the driver-operated driving operation device as the peripheral risk potential notification when first peripheral risk factors are detected, and to notify the driver of the peripheral risk potential by generating a discontinuous operation reaction force in the driver-operated driving operation device as the peripheral risk potential notification when second peripheral risk factors are detected.

4. The vehicle driving assist system according to claim 2, wherein
the host vehicle risk factor detection section is further configured to detect at least one of a host vehicle speed as at least part of the host vehicle risk factors and a lateral acceleration and detect a travel rule attributed to the host vehicle as at least part of the host vehicle risk factors;
the host vehicle risk potential calculation section is further configured to calculate a first host vehicle risk potential based on one of the host vehicle speed and the lateral acceleration that is attributed kinetic energy of the host vehicle, and to calculate a second host vehicle risk potential based on the travel rule attributed to the host vehicle; and
the risk potential notification section is further configured to notify the driver of the first host vehicle risk potential by generating a continuous operation reaction force in the driver-operated driving operation device as the host vehicle risk potential notification, and to notify the driver of the second host vehicle risk potential by generating a discontinuous operation reaction force in the driver-operated driving operation device as the host vehicle risk potential notification.

5. The vehicle driving assist system according to claim 2, wherein
the peripheral risk factor detection section is further configured to detect obstacles present in the area around the host vehicle as at least part of the peripheral risk factors;
the peripheral risk potential calculation section is further configured to calculate a first peripheral risk potential for the obstacles that remain relatively continuous with respect to the host vehicle, and a second peripheral risk potential for the obstacles that rapidly vary with respect to the host vehicle; and
the risk potential notification section is further configured to notify the driver of the first peripheral risk potential by generating a continuous operation reaction force in the driver-operated driving operation device as the peripheral risk potential notification, and to notify the driver of the second peripheral risk potential by generating a discontinuous operation reaction force in the driver-operated driving operation device as the peripheral risk potential notification.

6. The vehicle driving assist system according to claim 4, wherein
the peripheral risk factor detection section is further configured to detect obstacles present in the area around the host vehicle as at least part of the peripheral risk factors;
the peripheral risk potential calculation section is further configured to calculate a first peripheral risk potential for the obstacles that remain relatively continuous with respect to the host vehicle, and a second peripheral risk potential for the obstacles that rapidly vary with respect to the host vehicle; and
the risk potential notification section is further configured to notify the driver of the first peripheral risk potential by generating a continuous operation reaction force in the driver-operated driving operation device as the peripheral risk potential notification, and to notify the driver of the second peripheral risk potential by generating a discontinuous operation reaction force in the driver-operated driving operation device as the peripheral risk potential notification.

7. The vehicle driving assist system according to claim 6, wherein
the risk potential notification section is further configured to select the first host vehicle risk potential and the first peripheral risk potential that is greater to generate the continuous operation reaction force, and to select from among the second host vehicle risk potential and the second peripheral risk potential that has a higher priority to generate the discontinuous operation reaction force.

8. The vehicle driving assist system according to claim 7, wherein
the risk potential notification section is further configured to add the continuous operation reaction force to the discontinuous operation reaction force and generates a combined operation reaction force.

9. The vehicle driving assist system according to claim 4, wherein
the host vehicle risk factor detection section is further configured to detect at least one of an upper speed limit recommendation as a speed of the host vehicle and whether a road exists in at least one of left and right directions in which travel is not permitted as the travel rule.

10. The vehicle driving assist system according to claim 7, wherein
the risk potential notification section further includes a display control section configured to display on a display device information related to the second host vehicle factor risk potential when the discontinuous operation reaction force is generated in accordance with the second peripheral risk potential.

11. The vehicle driving assist system according to claim 6, further comprising
an operating state detecting section configured to detect an operating state of the driver-operated driving operation device; and the risk potential notification section being further configured to change the operation reaction force to a pulsing state in accordance with the second peripheral risk potential, and increase the operation reaction force in accordance with the second host vehicle risk factor when the driver-operated driving operation device is further operated.

12. The vehicle driving assist system according to claim 4, further comprising
an operating state detecting section configured to detect an operating state of the driver-operated driving operation device; and
the risk potential notification section being further configured to stop generating the discontinuous operation reaction force when the driver-operated driving operation device is further operated in a case in which the discontinuous operation reaction force is being generated.

13. The vehicle driving assist system according to claim 2, wherein
the driver-operated driving operation device is an accelerator pedal.

14. The vehicle driving assist system according to claim 2, wherein
the driver-operated driving operation device is a steering wheel.

15. A vehicle equipped with the vehicle driving assist system according to claim 1, wherein
the vehicle driving assist system is operatively installed to a vehicle body to assist a driver.

16. A vehicle driving assist system comprising:
means for detecting host vehicle risk factors related to a host vehicle;
means for detecting peripheral risk factors in an area around the host vehicle;
means for calculating a host vehicle risk potential attributed to the host vehicle risk factors that were detected;
means for calculating a peripheral risk potential attributed to the peripheral risk factors that were detected; and
means for notifying a driver of the host vehicle risk potential with a host vehicle risk potential notification and the peripheral risk potential with a peripheral risk potential notification using a common risk notification means for both the host vehicle risk potential notification and the peripheral risk potential notification.

17. A vehicle driving assist method comprising:
detecting host vehicle risk factors related to a host vehicle;
detecting peripheral risk factors in an area around the host vehicle;
calculating a host vehicle risk potential attributed to the host vehicle risk factors that were detected;
calculating a peripheral risk potential attributed to the peripheral risk factors that were detected; and
selectively notifying a driver of the host vehicle risk potential with a host vehicle risk potential notification and the peripheral risk potential with a peripheral risk potential notification using a common risk notification device for both the host vehicle risk potential notification and the peripheral risk potential notification.

* * * * *